United States Patent
Rabinowitz et al.

(10) Patent No.: US 8,233,091 B1
(45) Date of Patent: Jul. 31, 2012

(54) POSITIONING AND TIME TRANSFER USING TELEVISION SYNCHRONIZATION SIGNALS

(75) Inventors: Matthew Rabinowitz, Portola Valley, CA (US); James J. Spilker, Jr., Woodside, CA (US); Scott Furman, Menlo Park, CA (US); Dimitri Rubin, Cupertino, CA (US); Harvind Samra, Fairfield, CA (US); David Burgess, Fairfield, CA (US); Guttorm Opshaug, Menlo Park, CA (US); Jim Omura, San Francisco, CA (US)

(73) Assignee: TruePosition, Inc., Berwyn, PA (US)

( * ) Notice: Subject to any disclaimer, the term of this patent is extended or adjusted under 35 U.S.C. 154(b) by 1043 days.

(21) Appl. No.: 12/117,676

(22) Filed: May 8, 2008

Related U.S. Application Data

(60) Provisional application No. 60/938,247, filed on May 16, 2007.

(51) Int. Cl.
*H04N 5/44* (2011.01)
(52) U.S. Cl. ............... 348/554; 348/555; 725/68
(58) Field of Classification Search .......... 348/516, 348/554, 725, 731–733, 555, 558; 725/131–140, 725/151

See application file for complete search history.

(56) References Cited

U.S. PATENT DOCUMENTS

| | | |
|---|---|---|
| 4,555,707 A | 11/1985 | Connelly |
| 4,652,884 A | 3/1987 | Starker |
| 4,700,306 A | 10/1987 | Wallmander |
| 4,894,662 A | 1/1990 | Counselman |
| 5,045,861 A | 9/1991 | Duffett-Smith |
| 5,157,686 A | 10/1992 | Omura et al. |
| 5,166,952 A | 11/1992 | Omura et al. |
| 5,271,034 A | 12/1993 | Abaunza |
| 5,323,322 A | 6/1994 | Mueller et al. |
| 5,398,034 A | 3/1995 | Spilker, Jr. |
| 5,481,316 A | 1/1996 | Patel |
| 5,504,492 A | 4/1996 | Class et al. |
| 5,510,801 A | 4/1996 | Engelbrecht et al. |
| 5,604,765 A | 2/1997 | Bruno et al. |
| 5,630,206 A | 5/1997 | Urban et al. |
| 5,648,982 A | 7/1997 | Durrant et al. |

(Continued)

FOREIGN PATENT DOCUMENTS

DE 3242997 A1 5/1984

(Continued)

OTHER PUBLICATIONS

U.S. Appl. No. 12/476,992, Do, et al.

(Continued)

*Primary Examiner* — Annan Shang
(74) *Attorney, Agent, or Firm* — Woodcock Washburn LLP

(57) ABSTRACT

Methods having corresponding apparatus and computer-readable media comprise: receiving television signals and a message at an apparatus, wherein the television signals include an NTSC television signal and an ATSC television signal, wherein the message represents first and second arrival times representing absolute times of arrival at the apparatus of a first wavefront of the NTSC and ATSC television signals, respectively; measuring third and fourth arrival times, based on a local clock, after receiving the message, wherein the third and fourth arrival times represent times of arrival at the apparatus of a second wavefront of the NTSC and ATSC television signals, respectively; and providing a clock correction signal for the local clock based on the first arrival time, the second arrival time, the third arrival time, and the fourth arrival time.

39 Claims, 16 Drawing Sheets

U.S. PATENT DOCUMENTS

| | | | |
|---|---|---|---|
| 5,774,829 | A | 6/1998 | Cisneros et al. |
| 5,784,339 | A | 7/1998 | Woodsum et al. |
| 5,835,060 | A | 11/1998 | Czarnecki et al. |
| 5,920,284 | A | 7/1999 | Victor |
| 5,952,958 | A | 9/1999 | Speasl et al. |
| 5,953,311 | A | 9/1999 | Davies et al. |
| 6,006,097 | A | 12/1999 | Hornfeldt et al. |
| 6,016,119 | A | 1/2000 | Krasner |
| 6,078,284 | A | 6/2000 | Levanon |
| 6,094,168 | A | 7/2000 | Duffett-Smith et al. |
| 6,107,959 | A | 8/2000 | Levanon |
| 6,137,441 | A | 10/2000 | Dai et al. |
| 6,144,413 | A | 11/2000 | Zatsman |
| 6,147,642 | A | 11/2000 | Perry et al. |
| 6,181,921 | B1 | 1/2001 | Konisi et al. |
| 6,184,921 | B1 | 2/2001 | Limberg |
| 6,201,497 | B1 | 3/2001 | Snyder et al. |
| 6,215,778 | B1 | 4/2001 | Lomp et al. |
| 6,289,280 | B1 | 9/2001 | Fernandez-Corbaton et al. |
| 6,308,280 | B1 * | 10/2001 | Joseph et al. ................ 713/400 |
| 6,317,452 | B1 | 11/2001 | Durrant et al. |
| 6,317,500 | B1 | 11/2001 | Murphy |
| 6,373,432 | B1 | 4/2002 | Rabinowitz et al. |
| 6,374,177 | B1 | 4/2002 | Lee et al. |
| 6,400,753 | B1 | 6/2002 | Kohli et al. |
| 6,433,740 | B1 | 8/2002 | Gilhousen |
| 6,437,832 | B1 | 8/2002 | Grabb et al. |
| 6,484,034 | B1 | 11/2002 | Tsunehara et al. |
| 6,522,297 | B1 | 2/2003 | Rabinowitz et al. |
| 6,559,800 | B2 | 5/2003 | Rabinowitz et al. |
| 6,559,894 | B2 | 5/2003 | Omura et al. |
| 6,590,529 | B2 | 7/2003 | Schwoegler |
| 6,646,603 | B2 | 11/2003 | Dooley et al. |
| 6,717,547 | B2 | 4/2004 | Spilker, Jr. et al. |
| 6,727,847 | B2 | 4/2004 | Rabinowitz et al. |
| 6,753,812 | B2 | 6/2004 | Rabinowitz et al. |
| 6,806,830 | B2 | 10/2004 | Panasik et al. |
| 6,839,024 | B2 | 1/2005 | Spilker, Jr. et al. |
| 6,859,173 | B2 | 2/2005 | Spilker, Jr. et al. |
| 6,861,984 | B2 | 3/2005 | Rabinowitz et al. |
| 6,879,286 | B2 | 4/2005 | Rabinowitz et al. |
| 6,914,560 | B2 | 7/2005 | Spilker, Jr. et al. |
| 6,917,328 | B2 | 7/2005 | Rabinowitz et al. |
| 6,937,866 | B2 | 8/2005 | Duffett-Smith et al. |
| 6,952,182 | B2 | 10/2005 | Spilker, Jr. et al. |
| 6,961,020 | B2 | 11/2005 | Robinowitz et al. |
| 6,963,306 | B2 | 11/2005 | Spilker, Jr. et al. |
| 6,970,132 | B2 | 11/2005 | Spilker, Jr. et al. |
| 7,042,396 | B2 | 5/2006 | Omura et al. |
| 7,042,526 | B1 * | 5/2006 | Borseth ................ 348/731 |
| 7,042,949 | B1 | 5/2006 | Omura et al. |
| 7,126,536 | B2 | 10/2006 | Rabinowitz et al. |
| 7,260,378 | B2 | 8/2007 | Holland et al. |
| 7,269,424 | B2 | 9/2007 | Camp, Jr. |
| 7,372,405 | B2 | 5/2008 | Rabinowitz et al. |
| 7,463,195 | B2 | 12/2008 | Rabinowitz et al. |
| 2002/0122003 | A1 | 9/2002 | Patwari et al. |
| 2002/0168988 | A1 | 11/2002 | Younis |
| 2002/0184653 | A1 | 12/2002 | Pierce et al. |
| 2002/0199196 | A1 | 12/2002 | Rabinowitz et al. |
| 2003/0156063 | A1 * | 8/2003 | Spilker et al. ................ 342/464 |
| 2003/0162547 | A1 | 8/2003 | McNair |
| 2004/0073914 | A1 | 4/2004 | Spilker et al. |
| 2004/0201779 | A1 | 10/2004 | Spilker et al. |
| 2005/0066373 | A1 | 3/2005 | Rabinowitz |
| 2005/0251844 | A1 | 11/2005 | Martone et al. |
| 2007/0050824 | A1 | 3/2007 | Lee et al. |
| 2007/0121555 | A1 | 5/2007 | Burgess et al. |
| 2007/0131079 | A1 | 6/2007 | Opshaug et al. |
| 2007/0182633 | A1 | 8/2007 | Omura et al. |
| 2007/0296632 | A1 | 12/2007 | Opshaug et al. |
| 2008/0266453 | A1 * | 10/2008 | Fisher ................ 348/516 |

FOREIGN PATENT DOCUMENTS

| | | |
|---|---|---|
| EP | 58129277 | 8/1983 |
| GB | 2 222 922 A | 3/1990 |
| GB | 2 254 508 A | 10/1992 |

OTHER PUBLICATIONS

Duffett-Smith, et al., Precise Time Transfer in a Mobile Radio Terminal, ION NTM 2005, Jan. 24-26, 2005, San Diego, CA, pp. 1101-1106.
U.S. Appl. No. 10/008,613, Pierce, et al.
U.S. Appl. No. 11/380,691, Metzler, et al.
U.S. Appl. No. 11/535,485, Furman, et al.
U.S. Appl. No. 11/622,838, Rabinowitz, et al.
U.S. Appl. No. 11/770,162, Furman, et al.
U.S. Appl. No. 11/865,881, Opshaug, et al.
U.S. Appl. No. 12/168,141, Furman, et al.
Parkinson, B.W., et al., "Autonomous GPS Integrity Monitoring Using the Pseudorange Residual," *Journal of the Institute of Navigation* (1988), vol. 35, No. 2, pp. 255-274.
Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering, Stanford University* (Dec. 2000), pp. 59-73.
Spilker, Jr., J.J., "Fundamentals of Signal Tracking Theory," *Global Positioning System: Theory and Applications* (1994), vol. 1, Chapter 7, pp. 245-327.
Van Dierendock, A.J., "GPS Receivers," *Global Positioning System: Theory and Applications* (1995), vol. 1, Chapter 8, pp. 329-407.
Li, X., et al., "Indoor Geolocation Using OFDM Signals in HIPERLAN/2 Wireless LANS," 11th IEEE International Symposium on Personal Indoor and Mobile Radio Communications, PIMRC 2000, Proceedings (Cat. No. 00TH8525), Proceedings of 11th International Symposium on Personal Indoor and Mobile Radio Communication, London, UK, Sep. 18-21, pp. 1449-1453, vol. 2, XPO10520871, 2000, Piscataway, NJ, USA, IEEE, USA, ISBN; 9-7803-6463-5, Chapter I and III.
Rabinowitz, M., et al., "Positioning Using the ATSC Digital Television Signal," Rosum whitepaper, Online! 2001, XP002235053, Retrieved from the Internet on Mar. 13, 2003 at URL www.rosum.com/whitepaper8-7-01.pdf.
U.S. Appl. No. 12/209,971, filed Sep. 12, 2008, Do, et al.
U.S. Appl. No. 12/333,445, filed Dec. 12, 2008, Rubin, et al.
U.S. Appl. No. 12/351,841, filed Jan. 11, 2009, Lee, et al.
U.S. Appl. No. 12/263,731, Rabinowitz, et al.

* cited by examiner

900 ⟶

| 4 | 511 Symbols | 63 | 63 | 63 | 128 |

| 4 | 828 Symbols |

FIG. 10

POSITIONING AND TIME TRANSFER USING TELEVISION SYNCHRONIZATION SIGNALS

CROSS-REFERENCE TO RELATED APPLICATIONS

This application claims benefit of U.S. Provisional Patent Application Ser. No. 60/938,247 filed May 16, 2007, the disclosure thereof incorporated by reference herein in its entirety.

BACKGROUND

The present invention relates generally to television signals. More particularly, the present invention relates to positioning and time transfer using television synchronization signals.

SUMMARY

In general, in one aspect, an embodiment features an apparatus comprising: a first receiver adapted to receive television signals and a message, wherein the television signals include an NTSC television signal and an ATSC television signal, wherein the message represents a first arrival time and a second arrival time, wherein the first arrival time represents an absolute time of arrival at the apparatus of a first wavefront of the NTSC television signal, and wherein the second arrival time represents an absolute time of arrival at the apparatus of a first wavefront of the ATSC television signal; a local clock; a first arrival time module adapted to measure a third arrival time and a fourth arrival time, based on the local clock, after the first receiver receives the message, wherein the third arrival time represents a time of arrival at the apparatus of a second wavefront of the NTSC television signal, and wherein the fourth arrival time represents a time of arrival at the apparatus of a second wavefront of the ATSC television signal; and a clock correction unit adapted to provide a clock correction signal for the local clock based on the first arrival time, the second arrival time, the third arrival time, and the fourth arrival time.

Embodiments of the apparatus can include one or more of the following features. Some embodiments comprise a processing module adapted to determine, based on the first arrival time, the second arrival time, the third arrival time, and the fourth arrival time, at least one of an absolute time of arrival at the apparatus of the second wavefront of the NTSC television signal, and an absolute time of arrival at the apparatus of the second wavefront of the ATSC television signal. Some embodiments comprise a processing module adapted to determine a position of the apparatus based on the clock correction signal and at least one of the NTSC television signal, and the ATSC television signal. Some embodiments comprise a monitor unit adapted to provide the message. In some embodiments, the monitor unit comprises: a second receiver adapted to receive the television signals; a reference clock; a second arrival time module adapted to measure a fifth arrival time and a sixth arrival time based on the reference clock, wherein the fifth arrival time represents an absolute time of arrival at the monitor unit of the first wavefront of the NTSC television signal, and wherein the sixth arrival time represents an absolute time of arrival at the monitor unit of the first wavefront of the ATSC television signal; a processing module adapted to determine the first arrival time and the second arrival time based on the fifth arrival time and a sixth arrival time; and a transmitter adapted to transmit the message.

In general, in one aspect, an embodiment features an apparatus comprising: first receiver means for receiving television signals and a message, wherein the television signals include an NTSC television signal and an ATSC television signal, wherein the message represents a first arrival time and a second arrival time, wherein the first arrival time represents an absolute time of arrival at the apparatus of a first wavefront of the NTSC television signal, and wherein the second arrival time represents an absolute time of arrival at the apparatus of a first wavefront of the ATSC television signal; first arrival time means for measuring a third arrival time and a fourth arrival time, based on a local clock, after the first receiver means receives the message, wherein the third arrival time represents a time of arrival at the apparatus of a second wavefront of the NTSC television signal, and wherein the fourth arrival time represents a time of arrival at the apparatus of a second wavefront of the ATSC television signal; and clock correction means for providing a clock correction signal for the local clock based on the first arrival time, the second arrival time, the third arrival time, and the fourth arrival time.

Embodiments of the apparatus can include one or more of the following features. Some embodiments comprise processing means for determining, based on the first arrival time, the second arrival time, the third arrival time, and the fourth arrival time, at least one of an absolute time of arrival at the apparatus of the second wavefront of the NTSC television signal, and an absolute time of arrival at the apparatus of the second wavefront of the ATSC television signal. Some embodiments comprise processing means for determining a position of the apparatus based on the clock correction signal and at least one of the NTSC television signal, and the ATSC television signal. Some embodiments comprise monitor means for providing the message. In some embodiments, the monitor means comprises: second receiver means for receiving the television signals; a second arrival time module adapted to measure a fifth arrival time and a sixth arrival time based on a reference clock, wherein the fifth arrival time represents an absolute time of arrival at the monitor unit of the first wavefront of the NTSC television signal, and wherein the sixth arrival time represents an absolute time of arrival at the monitor unit of the first wavefront of the ATSC television signal; processing means for determining the first arrival time and the second arrival time based on the fifth arrival time and a sixth arrival time; and transmitter means for transmitting the message.

In general, in one aspect, an embodiment features a method comprising: receiving television signals and a message at an apparatus, wherein the television signals include an NTSC television signal and an ATSC television signal, wherein the message represents a first arrival time and a second arrival time, wherein the first arrival time represents an absolute time of arrival at the apparatus of a first wavefront of the NTSC television signal, and wherein the second arrival time represents an absolute time of arrival at the apparatus of a first wavefront of the ATSC television signal; measuring a third arrival time and a fourth arrival time, based on a local clock, after receiving the message, wherein the third arrival time represents a time of arrival at the apparatus of a second wavefront of the NTSC television signal, and wherein the fourth arrival time represents a time of arrival at the apparatus of a second wavefront of the ATSC television signal; and providing a clock correction signal for the local clock based on the first arrival time, the second arrival time, the third arrival time, and the fourth arrival time.

Embodiments of the method can include one or more of the following features. Some embodiments comprise determining, based on the first arrival time, the second arrival time, the third arrival time, and the fourth arrival time, at least one of an absolute time of arrival at the apparatus of the second wavefront of the NTSC television signal, and an absolute time of arrival at the apparatus of the second wavefront of the ATSC television signal. Some embodiments comprise determining a position of the apparatus based on the clock correction signal and at least one of the NTSC television signal, and the ATSC television signal. Some embodiments comprise providing the message. Some embodiments comprise receiving the television signals; measuring a fifth arrival time and a sixth arrival time based on a reference clock, wherein the fifth arrival time represents an absolute time of arrival at the monitor unit of the first wavefront of the NTSC television signal, and wherein the sixth arrival time represents an absolute time of arrival at the monitor unit of the first wavefront of the ATSC television signal; determining the first arrival time and the second arrival time based on the fifth arrival time and a sixth arrival time; and transmitting the message.

In general, in one aspect, an embodiment features a computer-readable media embodying instructions executable by a computer to perform a method comprising: receiving television signals and a message at an apparatus, wherein the television signals include an NTSC television signal and an ATSC television signal, wherein the message represents a first arrival time and a second arrival time, wherein the first arrival time represents an absolute time of arrival at the apparatus of a first wavefront of the NTSC television signal, and wherein the second arrival time represents an absolute time of arrival at the apparatus of a first wavefront of the ATSC television signal; measuring a third arrival time and a fourth arrival time, based on a local clock, after receiving the message, wherein the third arrival time represents a time of arrival at the apparatus of a second wavefront of the NTSC television signal, and wherein the fourth arrival time represents a time of arrival at the apparatus of a second wavefront of the ATSC television signal; and providing a clock correction signal for the local clock based on the first arrival time, the second arrival time, the third arrival time, and the fourth arrival time.

Embodiments of the computer program can include one or more of the following features. In some embodiments, the method further comprises: determining, based on the first arrival time, the second arrival time, the third arrival time, and the fourth arrival time, at least one of an absolute time of arrival at the apparatus of the second wavefront of the NTSC television signal, and an absolute time of arrival at the apparatus of the second wavefront of the ATSC television signal. In some embodiments, the method further comprises: determining a position of the apparatus based on the clock correction signal and at least one of the NTSC television signal, and the ATSC television signal. In some embodiments, the method further comprises: providing the message. In some embodiments, the method further comprises: receiving the television signals; measuring a fifth arrival time and a sixth arrival time based on a reference clock, wherein the fifth arrival time represents an absolute time of arrival at the monitor unit of the first wavefront of the NTSC television signal, and wherein the sixth arrival time represents an absolute time of arrival at the monitor unit of the first wavefront of the ATSC television signal; determining the first arrival time and the second arrival time based on the fifth arrival time and a sixth arrival time; and transmitting the message.

The details of one or more implementations are set forth in the accompanying drawings and the description below. Other features will be apparent from the description and drawings, and from the claims.

DESCRIPTION OF DRAWINGS

FIG. 9 illustrates the structure of the field synchronization segment of the ATSC frame.

FIG. 10 illustrates the structure of the data segment of the ATSC frame.

Figure 1:
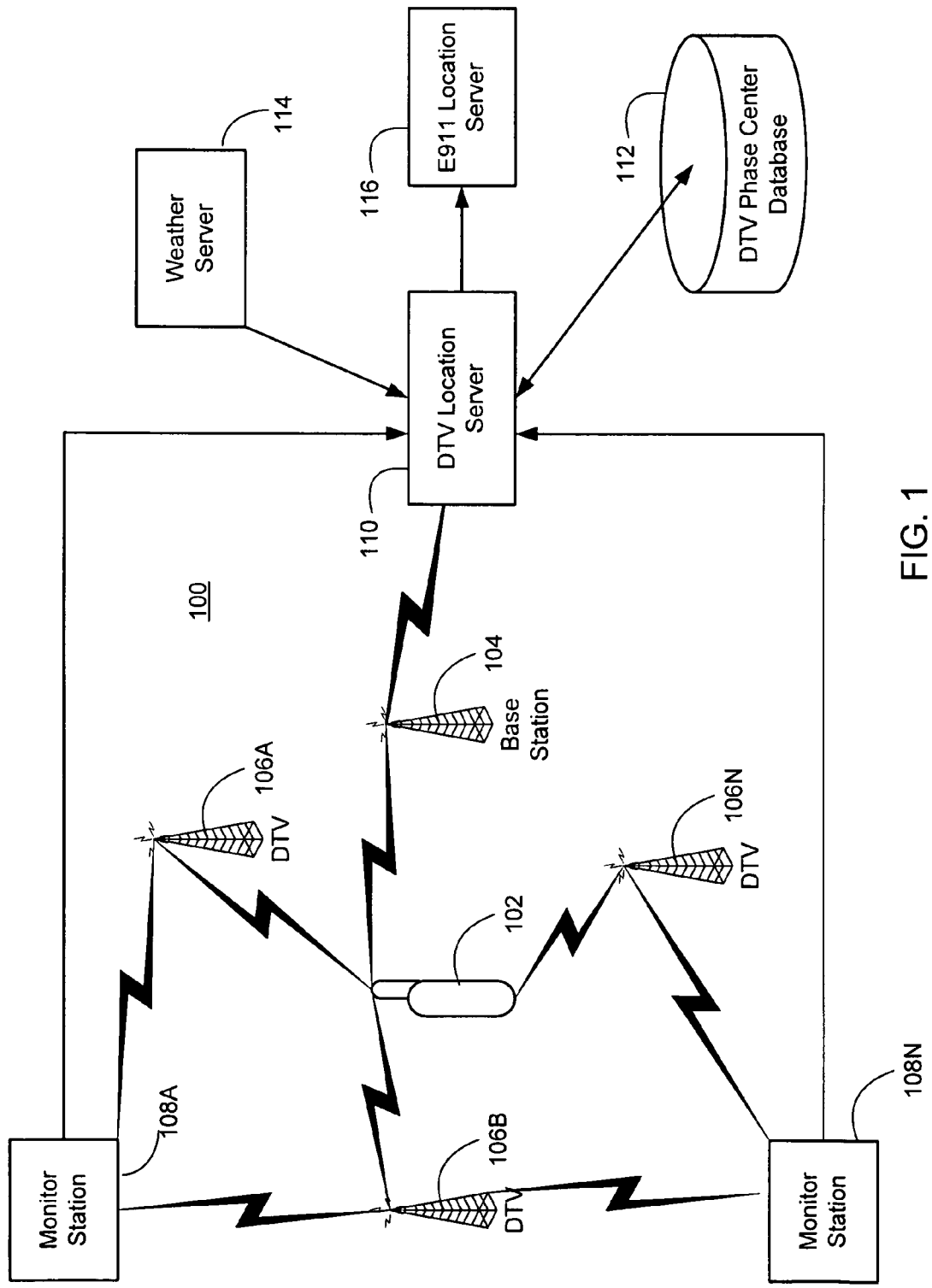
FIG. 1 depicts an implementation of the present invention including a user terminal that communicates over an air link with a base station.

The leading digit(s) of each reference numeral used in this specification indicates the number of the drawing in which the reference numeral first appears.

DETAILED DESCRIPTION

As used herein, the terms "client" and "server" generally refer to an electronic device or mechanism, and the term "message" generally refers to an electronic signal representing a digital message. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices such as special-purpose computers and the like.

Embodiments disclosed herein provide positioning and time transfer in a range of connected devices that must operate in inclement urban conditions. These devices include micro-cells for extending cellular networks to indoor environments, PDAs, laptops, cellular phones, asset tracking devices, radios for emergency response personnel, and the like. The techniques disclosed make use of synchronization signals that are part of the standard for television set forth by the American Television Standards Committee (ATSC). Consequently, the techniques described herein require no changes to the television broadcast stations. The signal can accommodate robust indoor positioning where the Global Positioning System (GPS) fails, because the synchronization signals typically have a power advantage over GPS of more than 40 dB. In addition, the effects of multipath are substantially mitigated because the signals have a bandwidth of roughly 6 MHz, and substantially superior geometry for triangulating lateral position to that which GPS can provide.

A wide range of VHF and UHF frequencies have been allocated to television stations; consequently, there is redundancy built into the system to protect against deep fades on particular channels. In addition, unlike GPS, the synchronization signals are not affected by transmitter Doppler, ionospheric propagation delays, or data that is modulated onto the signals. These techniques are not limited to ATSC signals, but may be applied to a wider range of television and other broadcast signals that include known synchronization components for which the time of arrival at a receiver can be measured. In overview, the technology exploits the considerable TV infrastructure to achieve more reliable, accurate and rapid time transfer and positioning than can be achieved with existing technologies.

Digital television was first implemented in the United States in 1998. As of February 2009, all television transmissions in the United States will be digital, and analog signals will be eliminated. A total of 1603 DTV stations are currently on the air in the United States, with another 119 stations planned. The signal structure used for DTV is specified by the American Television Standard Committee (ATSC).

Because of the physical characteristics of the signals that are used in most positioning technologies—such as the Global Positioning System (GPS)—no system designed to date can provide truly accurate and reliable location information indoors and in inclement urban areas. The best solutions to this problem involve integrated systems. Positioning techniques using TV signals are a suitable complement to GPS because they work in challenging urban environments where GPS tends to fail. The power of the TV signal, combined with the large number of available TV stations, makes it suitable for position location of connected devices throughout most of the United States, Europe, and Asia. The TV signals are at low frequencies well-suited for urban propagation, have bandwidths of 6 MHz or greater, and do not suffer from the Ionospheric and Doppler effects which hinder the performance of GPS.

The techniques disclosed herein employ the ATSC DTV signal for location and time transfer in the continental United States. However, in recent years synchronization signals have also been included in NTSC analog TV broadcasts. These synchronization signals are designed for channel modeling and multipath mitigation, and consequently can be used for accurate positioning. In addition, other DTV standards around the world (including DVB, DMB and ISDB-T) include synchronization codes which can be used for accurate positioning.

Techniques for determining the position of a user terminal using the ATSC DTV signal are disclosed in U.S. Non-provisional patent application Ser. No. 09/887,158 filed Jun. 21, 2001, the disclosure thereof incorporated by reference herein in its entirety. Techniques for determining the position of a user terminal using the European Telecommunications Standards Institute (ETSI) Digital Video Broadcasting-Terrestrial (DVB-T) signal are disclosed in U.S. Pat. No. 7,126,536, the disclosure thereof incorporated by reference herein in its entirety. Techniques for determining the position of a user terminal using the Japanese Integrated Services Digital Broadcasting-Terrestrial (ISDB-T) signal are disclosed in U.S. Pat. No. 6,952,182, the disclosure thereof incorporated by reference herein in its entirety. Techniques for determining the position of a user terminal using the NTSC (National Television System Committee) analog TV signal are disclosed in U.S. Pat. No. 6,559,800 and U.S. Pat. No. 6,522,297, the disclosures thereof incorporated by reference herein in their entirety.

Each of these television signals includes components that can be used to obtain a pseudo-range to the transmitter of the television signal. When multiple such pseudo-ranges are known, and the locations of the transmitters are known, the position of the user terminal can be determined with accuracy. Suitable components within the ATSC digital television signal include synchronization codes such as the Field Synchronization Segment within an ATSC data frame and the Synchronization Segment within a Data Segment within an ATSC data frame. Suitable components within the ETSI DVB-T and ISDB-T digital television signals include scattered pilot carriers. Suitable components within a Terrestrial Digital Media Broadcast (T-DMB) frame include the Phase Reference Signal. Suitable components within the NTSC analog television signal include the horizontal synchronization pulse, the horizontal blanking pulse, the horizontal blanking pulse and horizontal synchronization pulse taken together, the ghost canceling reference signal, the vertical interval test signal, and other chirp-type signals.

Positioning techniques using television signals should revolutionize the technology of navigation and position location. The ubiquitous availability of television signals allows for coverage anywhere that television is available. In fact, with the use of time-gated delay-lock loops, it is possible to use television signals for positioning even beyond those areas where television reception is available. Details are provided in, for example, U.S. Non-provisional patent application Ser. No. 10/054,262 filed Jan. 22, 2002, the disclosure thereof incorporated by reference herein in its entirety. However, in some situations, it is possible that a multiplicity of strong television signals will not be available due to less than adequate television availability, severe building attenuation, a severe multipath environment, or other causes. In addition, while television signals can provide very good positioning information on the horizontal plane, there may be situations, such as determining the position of police and firefighters in a building, where precise vertical information is necessary as well.

Referring to FIG. 1, an example implementation 100 includes a user terminal 102 that communicates over an air link with a base station 104. In one implementation, user terminal 102 is a wireless telephone and base station 104 is a wireless telephone base station. In one implementation, base station 104 is part of a mobile MAN (metropolitan area network) or WAN (wide area network).

FIG. 1 is used to illustrate various aspects of the invention but the invention is not limited to this implementation. For example, the phrase "user terminal" is meant to refer to any object capable of implementing the DTV position location described. Examples of user terminals include PDAs, mobile phones, cars and other vehicles, and any object which could include a chip or software implementing DTV position location. It is not intended to be limited to objects which are "terminals" or which are operated by "users."

Position Location Performed by a DTV Location Server

Figure 2:
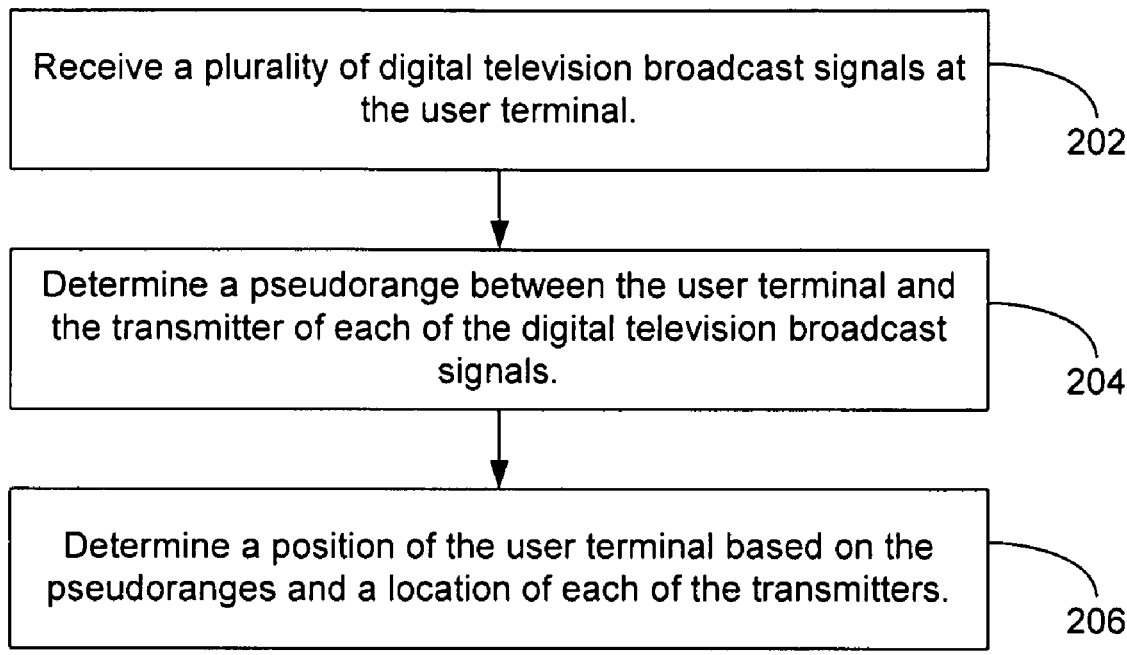
FIG. 2 illustrates an operation of an implementation of the invention.

FIG. 2 illustrates an operation of implementation 100. User terminal 102 receives DTV signals from a plurality of DTV transmitters 106A and 106B through 106N (step 202).

Various methods can be used to select which DTV channels to use in position location. In one implementation, a DTV location server 110 tells user terminal 102 of the best DTV channels to monitor. In one implementation, user terminal 102 exchanges messages with DTV location server 110 by way of base station 104. In one implementation user terminal 102 selects DTV channels to monitor based on the identity of base station 104 and a stored table correlating base stations and DTV channels. In another implementation, user terminal 102 can accept a location input from the user that gives a general indication of the area, such as the name of the nearest city; and uses this information to select DTV channels for processing. In one implementation, user terminal 102 scans available DTV channels to assemble a fingerprint of the location based on power levels of the available DTV channels. User terminal 102 compares this fingerprint to a stored table that matches known fingerprints with known locations to select DTV channels for processing.

User terminal 102 determines a pseudo-range between the user terminal 102 and each DTV transmitter 106 (step 204). Each pseudo-range represents the time difference (or equivalent distance) between a time of transmission from a transmitter 108 of a component of the DTV broadcast signal and a time of reception at the user terminal 102 of the component, as well as a clock offset at the user terminal.

User terminal 102 transmits the pseudo-ranges to DTV location server 110. In one implementation, DTV location server 110 is implemented as a general-purpose computer executing software designed to perform the operations described herein. In another implementation, DTV location server is implemented as an ASIC (application-specific integrated circuit). In one implementation, DTV location server 110 is implemented within or near base station 104.

The DTV signals are also received by a plurality of monitor units 108A through 108N. Each monitor unit can be implemented as a small unit including a transceiver and processor, and can be mounted in a convenient location such as a utility pole, DTV transmitters 106, or base stations 104. In one implementation, monitor units are implemented on satellites.

Each monitor unit 108 measures, for each of the DTV transmitters 106 from which it receives DTV signals, a time offset between the local clock of that DTV transmitter and a reference clock. In one implementation the reference clock is derived from GPS signals. The use of a reference clock permits the determination of the time offset for each DTV transmitter 106 when multiple monitor units 108 are used, since each monitor unit 108 can determine the time offset with respect to the reference clock. Thus, offsets in the local clocks of the monitor units 108 do not affect these determinations.

In another implementation, no external time reference is needed. According to this implementation, a single monitor unit receives DTV signals from all of the same DTV transmitters as does user terminal 102. In effect, the local clock of the single monitor unit functions as the time reference.

In one implementation, each time offset is modeled as a fixed offset. In another implementation each time offset is modeled as a second order polynomial fit of the form $$\text{Offset} = a + b(t-T) + c(t-T)^2 \qquad (1)$$

that can be described by a, b, c, and T. In either implementation, each measured time offset is transmitted periodically to the DTV location server using the Internet, a secured modem connection or the like. In one implementation, the location of each monitor unit 108 is determined using GPS receivers.

DTV location server 110 receives information describing the phase center (i.e., the location) of each DTV transmitter 106 from a database 112. In one implementation, the phase center of each DTV transmitter 106 is measured by using monitor units 108 at different locations to measure the phase center directly. In another implementation, the phase center of each DTV transmitter 106 is measured by surveying the antenna phase center.

In one implementation, DTV location server 110 receives weather information describing the air temperature, atmospheric pressure, and humidity in the vicinity of user terminal 102 from a weather server 114. The weather information is available from the Internet and other sources such as NOAA. DTV location server 110 determines tropospheric propagation velocity from the weather information using techniques such as those disclosed in B. Parkinson and J. Spilker, Jr. Global Positioning System-Theory and Applications, AIAA, Washington, D.C., 1996, Vol. 1, Chapter 17 Tropospheric Effects on GPS by J. Spilker, Jr.

DTV location server 110 can also receive from base station 104 information which identifies a general geographic location of user terminal 102. For example, the information can identify a cell or cell sector within which a cellular telephone is located. This information is used for ambiguity resolution, as described below.

Figure 3:
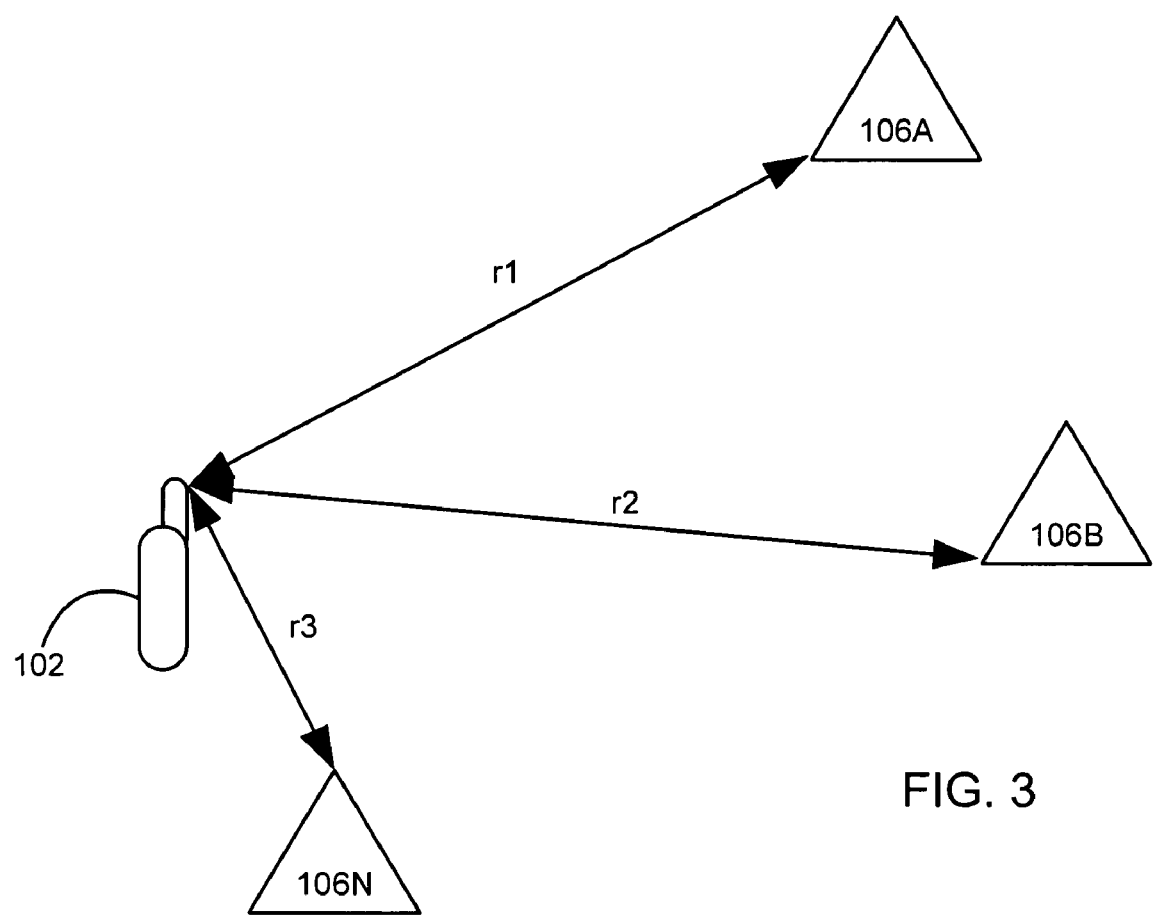
FIG. 3 depicts the geometry of a position determination using 3 DTV transmitters.

DTV location server 110 determines a position of the user terminal based on the pseudo-ranges and a location of each of the transmitters (step 206). FIG. 3 depicts the geometry of a position determination using three DTV transmitters 106. DTV transmitter 106A is located at position (x1, y1). The range between user terminal 102 and DTV transmitter 106A is r1. DTV 106B transmitter is located at position (x2, y2). The range between user terminal 102 and DTV transmitter 106B is r2. DTV transmitter 106N is located at position (x3, y3). The range between user terminal 102 and DTV transmitter 106N is r3.

DTV location server 110 may adjust the value of each pseudo-range according to the tropospheric propagation velocity and the time offset for the corresponding DTV transmitter 106. DTV location server 110 uses the phase center information from database 112 to determine the position of each DTV transmitter 106.

User terminal 102 makes three or more pseudo-range measurements to solve for three unknowns, namely the position (x, y) and clock offset T of user terminal 102. In other implementations, the techniques disclosed herein are used to determine position in three dimensions such as longitude, latitude, and altitude, and can include factors such as the altitude of the DTV transmitters.

The three pseudo-range measurements pr1, pr2 and pr3 are given by $$pr1 = r1 + T \qquad (2a)$$

$$pr2 = r2 + T \qquad (3a)$$

$$pr3 = r3 + T \qquad (4a)$$

The three ranges can be expressed as $$r1 = |X - X1| \qquad (5)$$

$$r2 = |X - X2| \qquad (6)$$

$$r3 = |X - X3| \qquad (7)$$

where X represents the two-dimensional vector position (x, y) of user terminal, X1 represents the two-dimensional vector position (x1, y1) of DTV transmitter 106A, X2 represents the two-dimensional vector position (x2, y2) of DTV transmitter 106B, and X3 represents the two-dimensional vector position (x3, y3) of DTV transmitter 106N. These relationships produce three equations in which to solve for the three unknowns x, y, and T. DTV locations server 110 solves these equations according to conventional well-known methods. In an E911 application, the position of user terminal 102 is transmitted to E911 location server 116 for distribution to the proper authorities. In another application, the position is transmitted to user terminal 102.

Now, techniques for projecting the measurements at the user terminal 102 to a common instant in time are described. Note that this is not necessary if the clock of the user terminal 102 is stabilized or corrected using a signal from the cellular base station or a DTV transmitter 106. When the user clock is not stabilized, or corrected, the user clock offset can be considered to be a function of time, T(t). For a small time interval, Δ, the clock offset, T(t), can be modeled by a constant and a first order term. Namely, $$T(t+\Delta) = T(t) + \frac{\partial T}{\partial t}\Delta \quad (8)$$

We now reconsider equations (2a)-(4a) treating the clock offset as a function of time. Consequently, the pseudo-range measurements are also a function of time. For clarity, we assume that the ranges remain essentially constant over the interval Δ. The pseudo-range measurements may be described as:

$$pr1(t1) = r1 + T(t1) \quad (2b)$$

$$pr2(t2) = r2 + T(t2) \quad (3b)$$

$$prN(tN) = rN + T(tN) \quad (4b)$$

In one embodiment, the user terminal 102 commences with an additional set of pseudo-range measurements at some time Δ after the initial set of measurements. These measurements may be described:

$$pr1(t1+\Delta) = r1 + T(t1) + \frac{\partial T}{\partial t}\Delta \quad (2c)$$

$$pr2(t2+\Delta) = r2 + T(t2) + \frac{\partial T}{\partial t}\Delta \quad (3c)$$

$$prN(tN+\Delta) = rN + T(tN) + \frac{\partial T}{\partial t}\Delta \quad (4c)$$

The user terminal 102 then projects all the pseudo-range measurements to some common point in time so that the effect of the first order term is effectively eliminated. For example, consider if some common reference time t0 is used. Applying equations (2b-4b) and (2c-4c) it is straightforward to show that we can project the measurements to a common instant of time as follows:

$$pr1(t0) = pr1(t1) + [pr1(t1+\Delta) - pr1(t1)](t0-t1)/\Delta \quad (2d)$$

$$pr2(t0) = pr2(t2) + [pr2(t2+\Delta) - pr2(t2)](t0-t2)/\Delta \quad (3d)$$

$$prN(t0) = prN(tN) + [prN(tN+\Delta) - prN(tN)](t0-tN)/\Delta \quad (4d)$$

These projected pseudo-range measurements are communicated to the location server where they are used to solve the three unknowns x, y, and T. Note that the projection in equations (2d-4d) is not precise, and second order terms are not accounted for. However the resulting errors are not significant. One skilled in the art will recognize that second order and higher terms may be accounted for by making more than two pseudo-range measurements for each projection. Notice also that there are many other approaches to implementing this concept of projecting the pseudo-range measurements to the same instant of time. One approach, for example, is to implement a delay lock loop such as those disclosed in J. J. Spilker, Jr., Digital Communications by Satellite, Prentice-Hall, Englewood Cliffs, N.J., 1977, 1995 and B. W. Parkinson and J. J. Spilker, Jr., Global Positioning System-Theory and Application, Volume 1, AIAA, Washington, D.C. 1996, both incorporated by reference herein. A separate tracking loop can be dedicated to each DTV transmitter 106. These tracking loops effectively interpolate between pseudo-range measurements. The state of each of these tracking loops is sampled at the same instant of time.

In another implementation, user terminal 102 does not compute pseudo-ranges, but rather takes measurements of the DTV signals that are sufficient to compute pseudo-range, and transmits these measurements to DTV location server 110. DTV location server 110 then computes the pseudo-ranges based on the measurements, and computes the position based on the pseudo-ranges, as described above.

Position Location Performed by User Terminal

In another implementation, the position of user terminal 102 is computed by user terminal 102. In this implementation, all of the necessary information is transmitted to user terminal 102. This information can be transmitted to user terminal by DTV location server 110, base station 104, one or more DTV transmitters 106, or any combination thereof. User terminal 102 then measures the pseudo-ranges and solves the simultaneous equations as described above. This implementation is now described.

User terminal 102 receives the time offset between the local clock of each DTV transmitter and a reference clock. User terminal 102 also receives information describing the phase center of each DTV transmitter 106 from a database 112.

User terminal 102 receives the tropospheric propagation velocity computed by DTV locations server 110. In another implementation, user terminal 102 receives weather information describing the air temperature, atmospheric pressure, and humidity in the vicinity of user terminal 102 from a weather server 114. and determines tropospheric propagation velocity from the weather information using conventional techniques.

User terminal 102 can also receive from base station 104 information which identifies the rough location of user terminal 102. For example, the information can identify a cell or cell sector within which a cellular telephone is located. This information is used for ambiguity resolution, as described below.

User terminal 102 receives DTV signals from a plurality of DTV transmitters 106 and determines a pseudo-range between the user terminal 102 and each DTV transmitter 106. User terminal 102 then determines its position based on the pseudo-ranges and the phase centers of the transmitters.

In any of these of the implementations, should only two DTV transmitters be available, the position of user terminal 102 can be determined using the two DTV transmitters and the offset T computed during a previous position determination. The values of T can be stored or maintained according to conventional methods.

In one implementation, base station 104 determines the clock offset of user terminal 102. In this implementation, only two DTV transmitters are required for position determination. Base station 104 transmits the clock offset T to DTV location server 110, which then determines the position of user terminal 102 from the pseudo-range computed for each of the DTV transmitters.

In another implementation, when only one or two DTV transmitters are available for position determination, GPS is used to augment the position determination. Techniques for positioning using TV and GPS signals are also disclosed in U.S. Non-provisional patent application Ser. No. 10/159,478 filed May 31, 2002, the disclosure thereof incorporated by reference herein in its entirety.

Receiver Architecture

Figure 4:
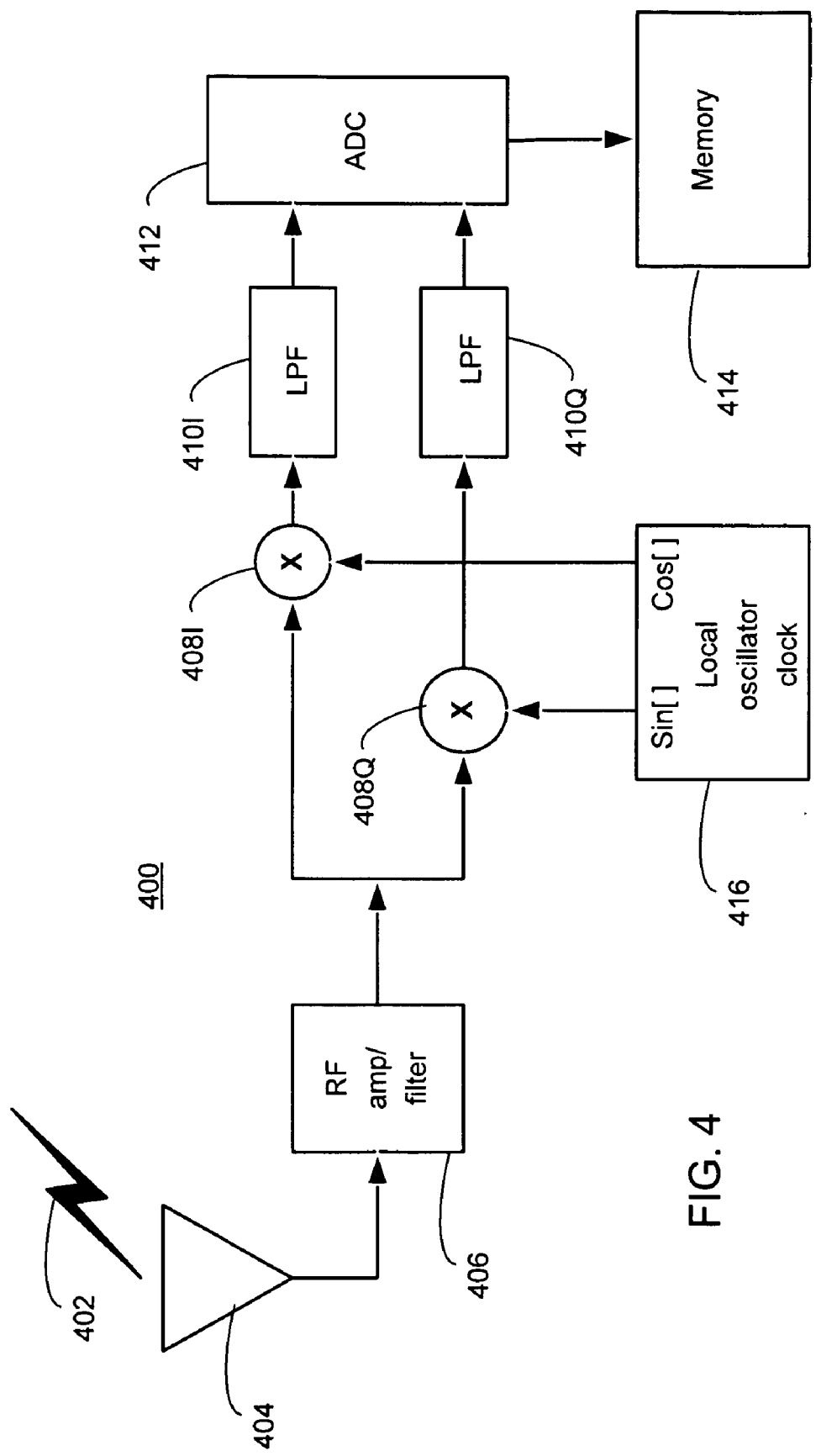
FIG. 4 depicts an implementation of a sampler for use in taking samples of received DTV signals.

FIG. 4 depicts an implementation 400 of a sampler for use in taking samples of received DTV signals. In one implementation, sampler 400 is implemented within user terminal 102. In another implementation, sampler 400 is implemented within monitor units 108. The sampling rate should be sufficiently high to obtain an accurate representation of the DTV signal, as would be apparent to one skilled in the art.

Sampler 400 receives a DTV signal 402 at an antenna 404. A radio frequency (RF) amp/filter 406 amplifies and filters the received DTV signal. A local oscillator clock 416 and mixers 408I and 408Q downconvert the signal to produce in-phase (I) and quadrature (Q) samples, respectively. The I and Q samples are respectively filtered by low-pass filters (LPF) 410I and 410Q. An analog-to-digital converter (ADC) 412 converts the I and Q samples to digital form. The digital I and Q samples are stored in a memory 414.

Figure 5:
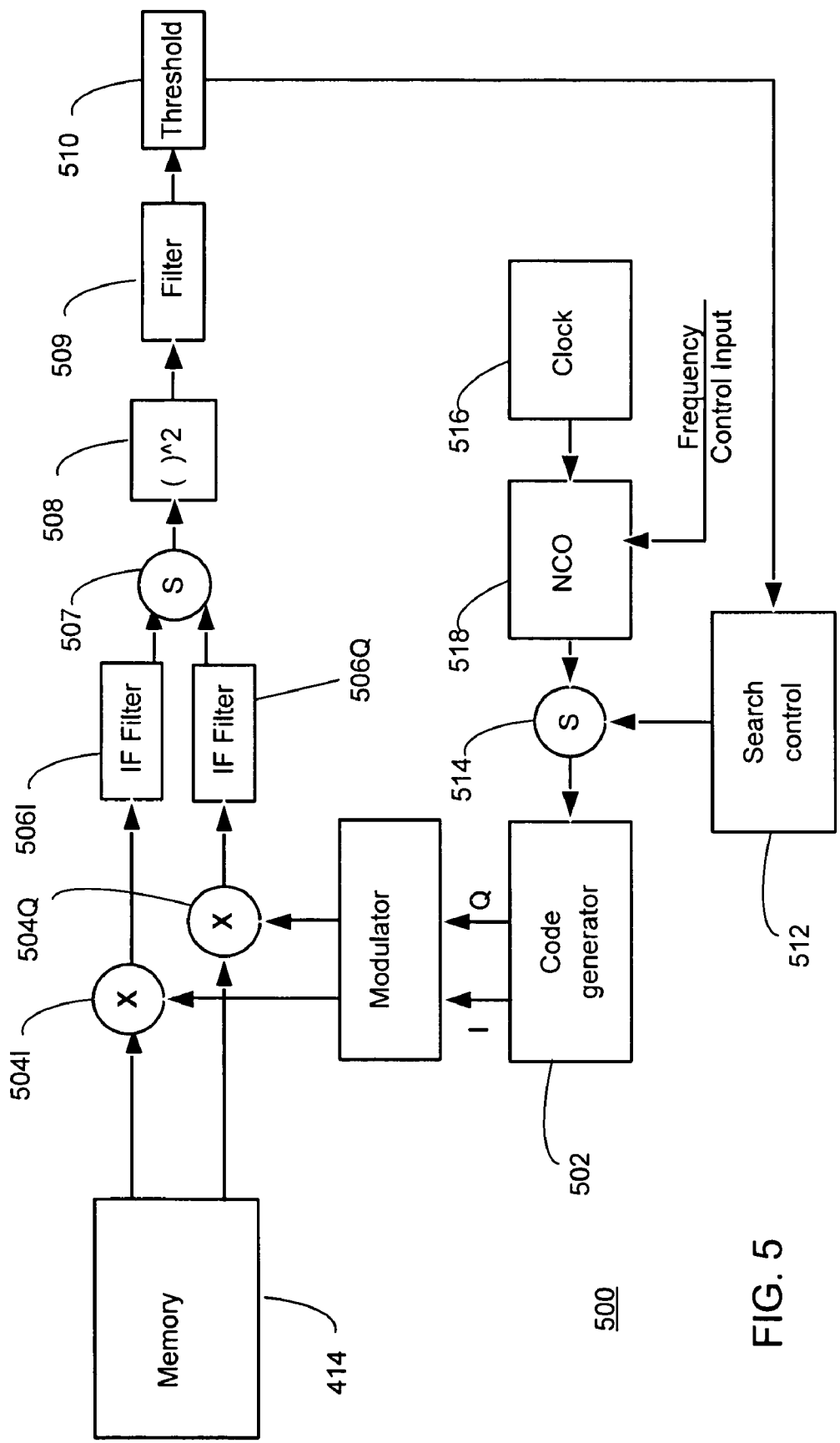
FIG. 5 depicts an implementation of a noncoherent correlator for use in searching for the correlation peak of the DTV signal samples produced by the sampler of FIG. 4.

FIG. 5 depicts an implementation 500 of a noncoherent correlator for use in searching for the correlation peak of the DTV signal samples produced by sampler 400. In one implementation, correlator 500 is implemented within user terminal 102. In another implementation, correlator 500 is implemented within monitor units 108.

Correlator 500 retrieves the I and Q samples of a DTV signal from memory 414. Correlator 500 processes the samples at intermediate frequency (IF). Other implementations process the samples in analog or digital form, and can operate at intermediate frequency (IF) or at baseband.

A code generator 502 generates a code sequence. In one implementation, the code sequence is a raised cosine waveform. The code sequence can be any known digital sequence in the ATSC frame. In one implementation, the code is a synchronization code. In one implementation, the synchronization code is a Field Synchronization Segment within an ATSC data frame. In another implementation, the synchronization code is a Synchronization Segment within a Data Segment within an ATSC data frame. In still another implementation, the synchronization code includes both the Field Synchronization Segment within an ATSC data frame and the Synchronization Segments within the Data Segments within an ATSC data frame.

Mixers 504I and 504Q respectively combine the I and Q samples with the code generated by code generator 502. The outputs of mixers 504I and 504Q are respectively filtered by filters 506I and 506Q and provided to summer 507. The sum is provided to square law device 508. Filter 509 performs an envelope detection for non-coherent correlation, according to conventional methods. Comparator 510 compares the correlation output to a predetermined threshold. If the correlation output falls below the threshold, search control 512 causes summer 514 to add additional pulses to the clocking waveform produced by clock 516, thereby advancing the code generator by one symbol time, and the process repeats. In a preferred embodiment, the clocking waveform has a nominal clock rate of 10.76 MHz, matching the clock rate or symbol rate of the received DTV signals.

When the correlation output first exceeds the threshold, the process is done. The time offset that produced the correlation output is used as the pseudo-range for that DTV transmitter 106.

In receiver correlators and matched filters there are two important sources of receiver degradation. The user terminal local oscillator is often of relatively poor stability in frequency. This instability affects two different receiver parameters. First, it causes a frequency offset in the receiver signal. Second, it causes the received bit pattern to slip relative to the symbol rate of the reference clock. Both of these effects can limit the integration time of the receiver and hence the processing gain of the receiver. The integration time can be increased by correcting the receiver reference clock. In one implementation a delay lock loop automatically corrects for the receiver clock.

In another implementation a NCO (numerically controlled oscillator) 518 adjusts the clock frequency of the receiver to match that of the incoming received signal clock frequency and compensate for drifts and frequency offsets of the local oscillator in user terminal 102. Increased accuracy of the clock frequency permits longer integration times and better performance of the receiver correlator. The frequency control input of NCO 518 can be derived from several possible sources, a receiver symbol clock rate synchronizer, tracking of the ATSC pilot carrier, or other clock rate discriminator techniques installed in NCO 518.

Position Location Enhancements

Figure 6:
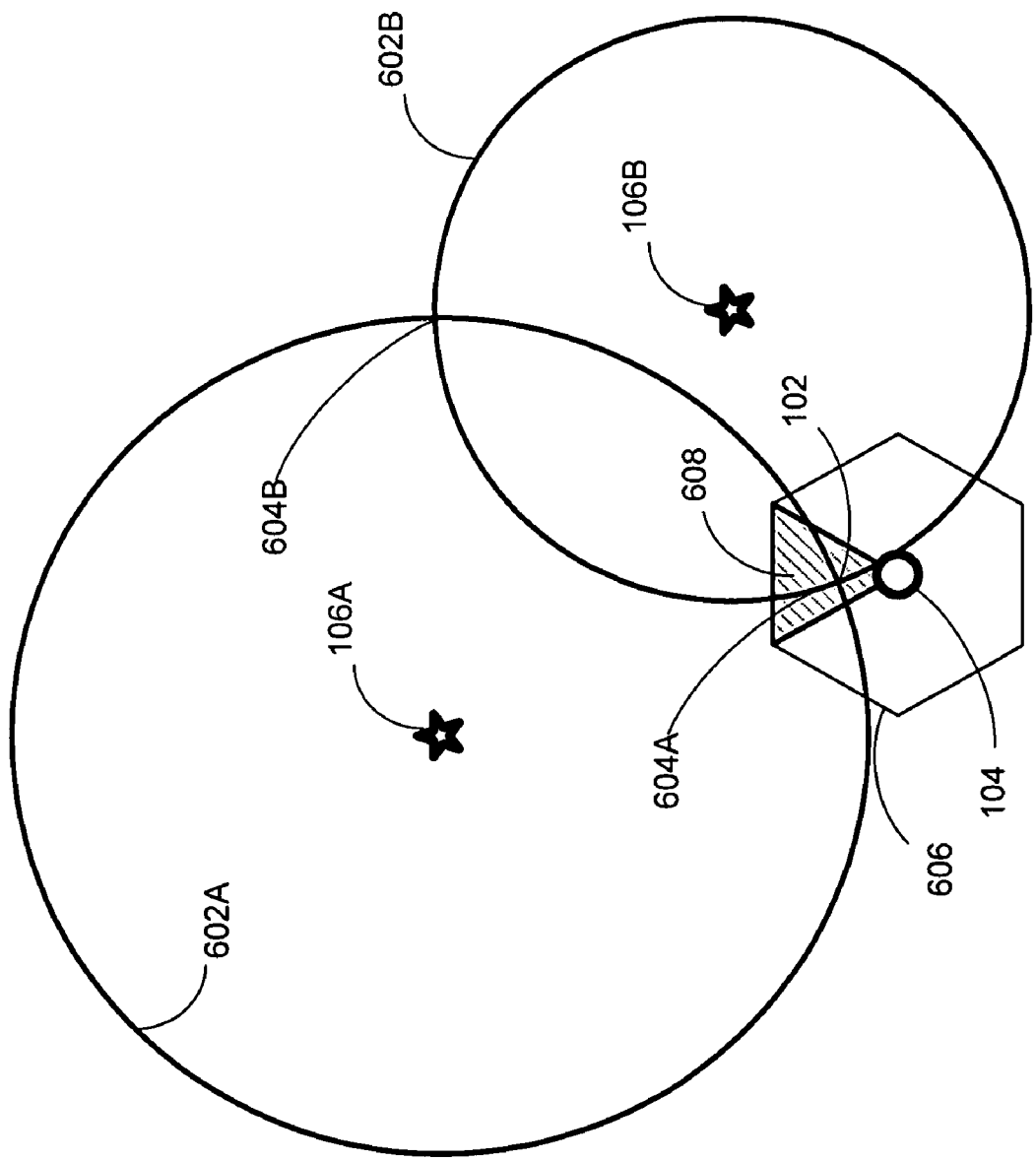
FIG. 6 illustrates a simple example of a position location calculation for a user terminal receiving DTV signals from two separate DTV antennas.

FIG. 6 illustrates a simple example of a position location calculation for a user terminal 102 receiving DTV signals from two separate DTV antennas 106A and 106B. Circles of constant range 602A and 602B are drawn about each of transmit antennas 106A and 106B, respectively. The position for a user terminal, including correction for the user terminal clock offset, is then at one of the intersections 604A and 604B of the two circles 602A and 602B. The ambiguity is resolved by noting that base station 104 can determine in which sector 608 of its footprint (that is, its coverage area) 606 the user terminal is located. Of course if there are more than two DTV transmitters in view, the ambiguity can be resolved by taking the intersection of three circles.

In one implementation, user terminal 102 can accept an input from the user that gives a general indication of the area, such as the name of the nearest city. In one implementation, user terminal 102 scans available DTV channels to assemble a fingerprint of the location. User terminal 102 compares this fingerprint to a stored table that matches known fingerprints with known locations to identify the current location of user terminal 102.

Figure 7:
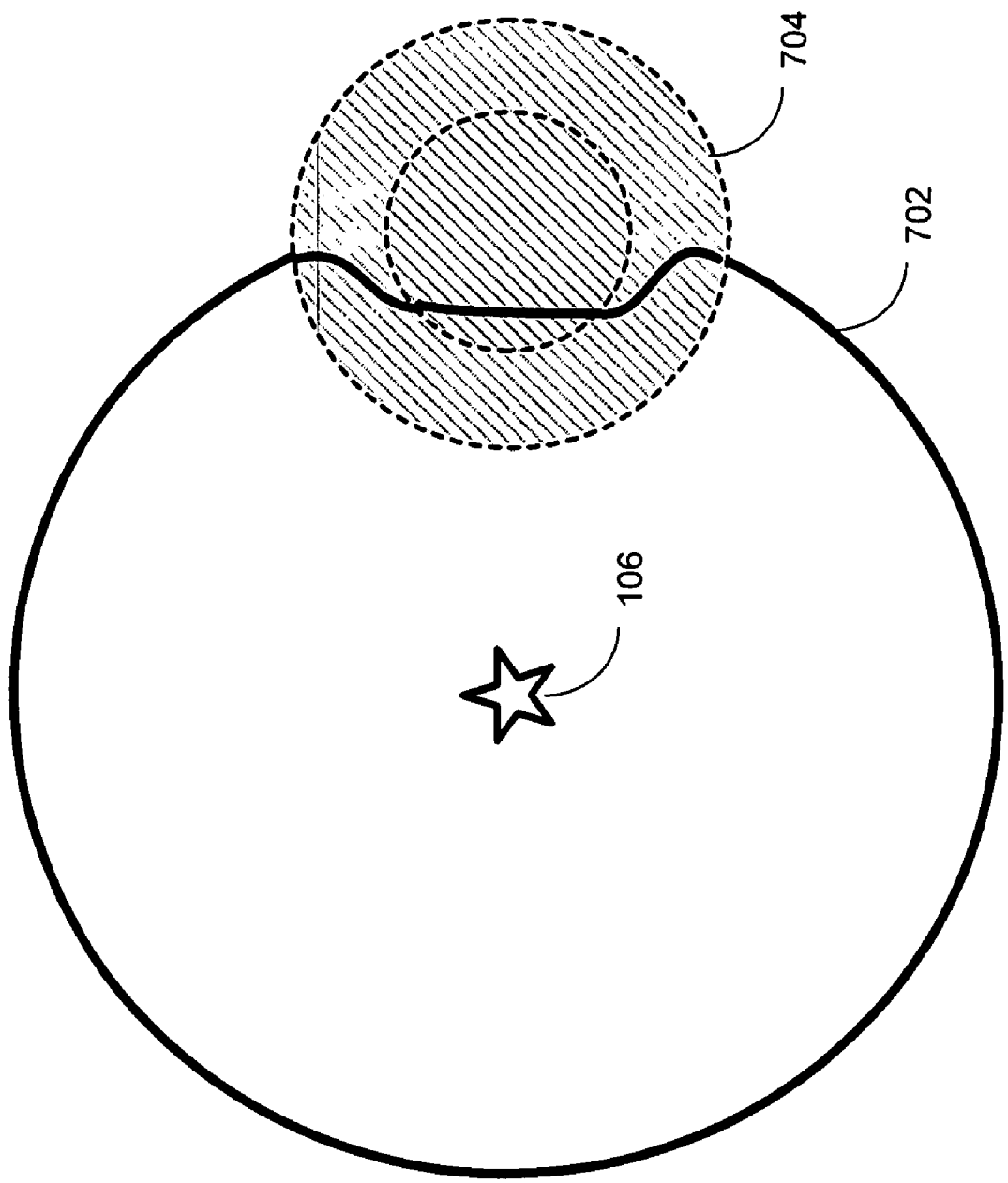
FIG. 7 depicts the effects of a single hill on a circle of constant range for a DTV transmitter that is located at the same altitude as the surrounding land.

In one implementation the position location calculation includes the effects of ground elevation. Thus in terrain with hills and valleys relative to the phase center of the DTV antenna 106 the circles of constant range are distorted. FIG. 7 depicts the effects of a single hill 704 on a circle of constant range 702 for a DTV transmitter 106 that is located at the same altitude as the surrounding land.

The computations of user position are easily made by a simple computer having as its database a terrain topographic map which allows the computations to include the effect of user altitude on the surface of the earth, the geoid. This calculation has the effect of distorting the circles of constant range as shown in FIG. 7.

ATSC Signal Description

Figure 8:
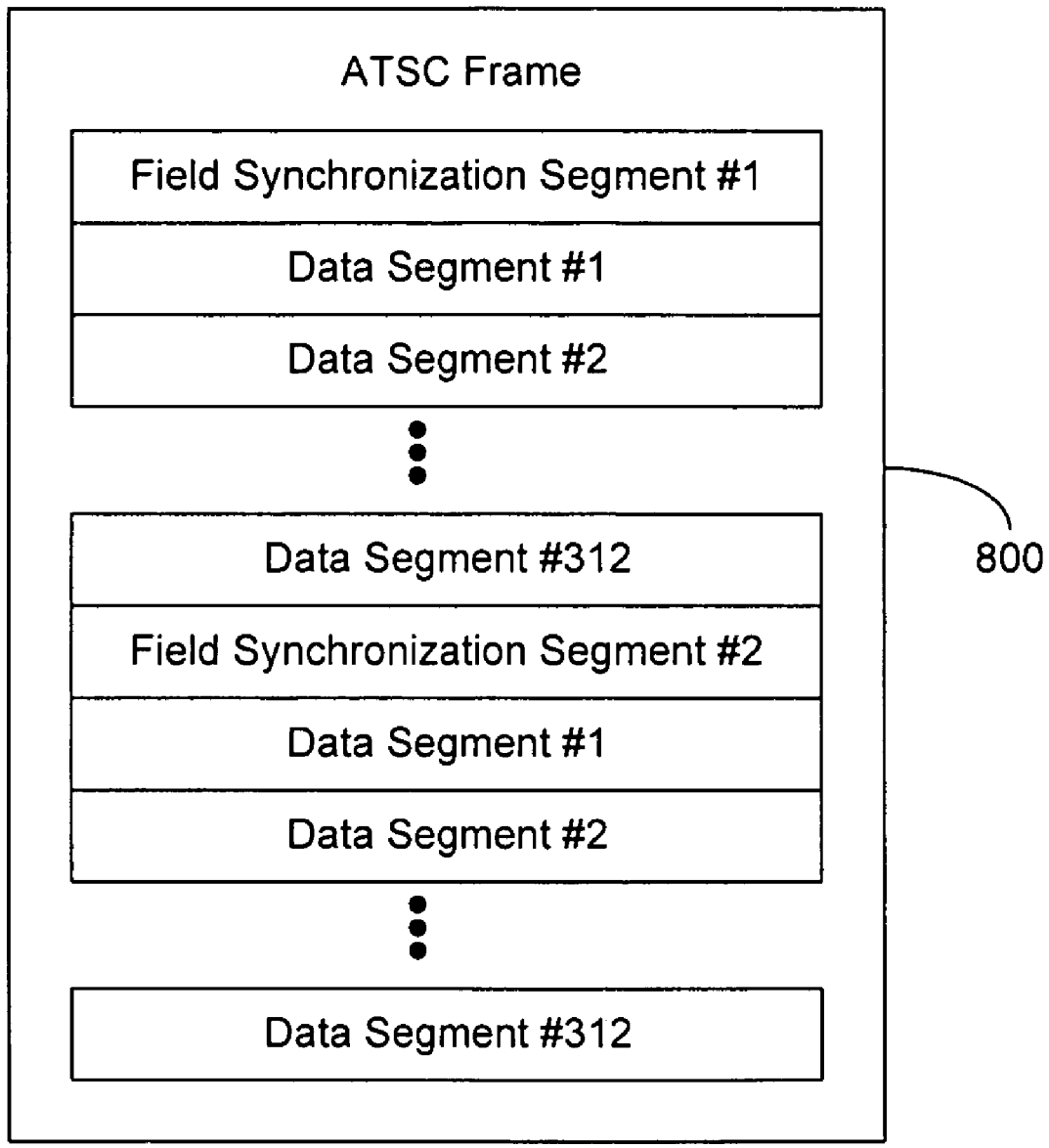
FIG. 8 illustrates the structure of the ATSC frame.

The current ATSC signal is described in "ATSC Digital Television Standard and Amendment No. 1," Mar. 16, 2000, by the Advanced Television Systems Committee. The ATSC signal uses 8-ary Vestigial Sideband Modulation (8VSB). The symbol rate of the ATSC signal is 10.762237 MHz, which is derived from a 27.000000 MHz clock. The structure 800 of the ATSC frame is illustrated in FIG. 8. The frame 800 consists of a total of 626 segments, each with 832 symbols, for a total of 520832 symbols. There are two field synchronization segments in each frame. Following each field synchronization segment are 312 data segments. Each segment begins with 4 symbols that are used for synchronization purposes.

The structure 900 of the field synchronization segment is illustrated in FIG. 9. The two field synchronization segments 900 in a frame 800 differ only to the extent that the middle set of 63 symbols are inverted in the second field synchronization segment.

The structure 1000 of the data segment is illustrated in FIG. 10. The first four symbols of data segment 1000 (which are −1, 1, 1, −1) are used for segment synchronization. The other 828 symbols in data segment 1000 carry data. Since the modulation scheme is 8VSB, each symbol carries 3 bits of coded data. A rate 2/3 coding scheme is used.

Implementations of the invention can be extended to use future enhancements to DTV signals. For example, the ATSC signal specification allows for a high rate 16VSB signal. However, the 16VSB signal has the same field synch pattern as the 8VSB signal. Therefore, a single implementation of the present invention can be designed to work equally well with both the 8VSB and the 16VSB signal.

Figure 11:
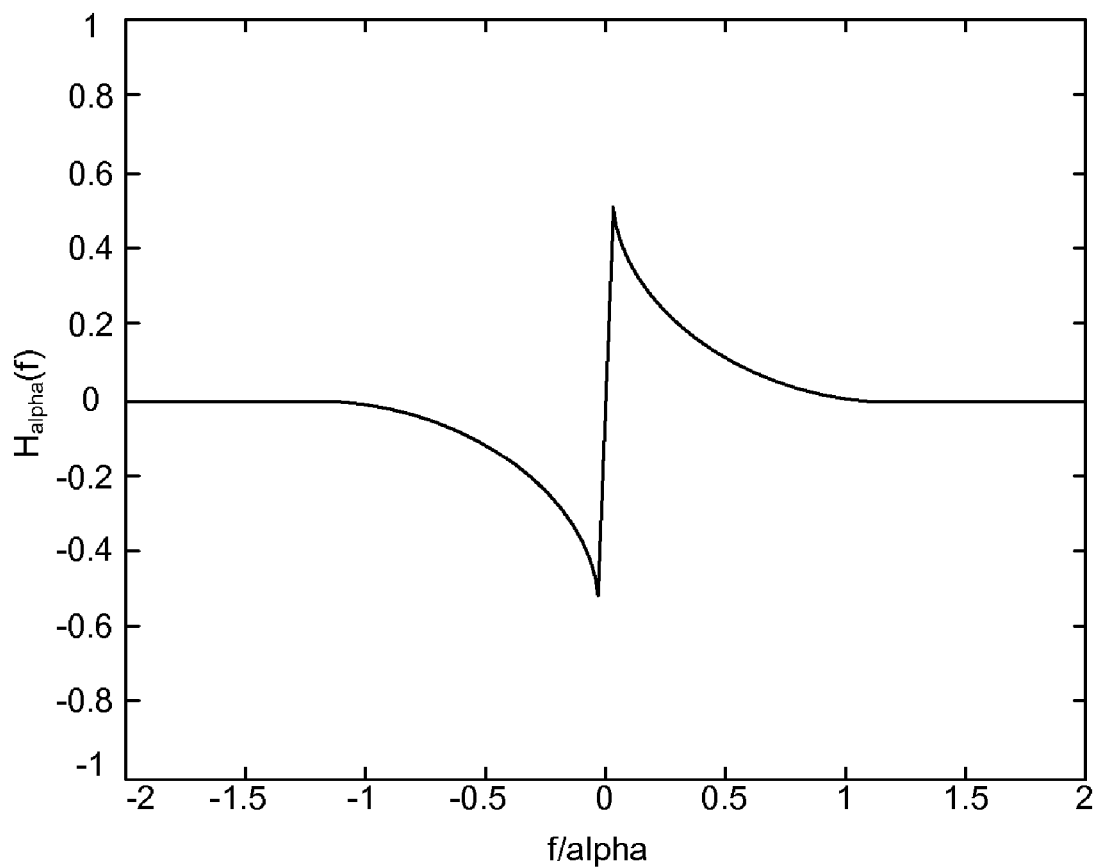
FIG. 11 shows a plot of the gain function for a filter used in producing an ATSC DTV signal.

The 8VSB signal is constructed by filtering. The in-phase segment of the symbol pulse has a raised-cosine characteristic, as described in J. G. Proakis, Digital Communications, McGraw-Hill, 3$^{rd}$ edition, 1995. The pulse can be described as $$p(t) = \operatorname{sinc}\left(\frac{\pi t}{T}\right) \frac{\cos\left(\frac{\pi \beta t}{T}\right)}{1 - \frac{4\beta^2 t^2}{T^2}} \tag{8}$$

where T is the symbol period $$T = \frac{1}{10.76 \times 10^6} \tag{9}$$

and β=0.5762. This signal has a frequency characteristic $$P(f) = \begin{cases} T & \left(0 \le |f| \le \frac{1-\beta}{2T}\right) \\ \frac{T}{2}\left\{1 + \cos\left[\frac{\pi T}{\beta}\left(|f| - \frac{1-\beta}{2T}\right)\right]\right\} & \left(\frac{1-\beta}{2T} \le |f| \le \frac{1+\beta}{2T}\right) \\ 0 & \left(|f| \le \frac{1+\beta}{2T}\right) \end{cases} \tag{10}$$

from which it is clear that the one-sided bandwidth of the signal is (1+β)10.762237 MHz=5.38 MHz+0.31 MHz. In order to create a VSB signal from this in-phase pulse, the signal is filtered so that only a small portion of the lower sideband remains. This filtering can be described as:

$$P_v(f) = P(f)(U(f) - H_\alpha(f)) \tag{11}$$

where $$U(f) = \begin{cases} 1, f \ge 0 \\ 0, f < 0 \end{cases} \tag{12}$$

where $H_\alpha(f)$ is a filter designed to leave a vestigial remainder of the lower sideband. A plot of the gain function for $H_\alpha(f)$ is shown in FIG. 11. The filter satisfies the characteristics $H_\alpha(-f)=-H_{\alpha a}(f)$ and $H_\alpha(f)=0$, f>α.

The response U(f)P(f) can be represented as $$U(f)P(f) = \frac{1}{2}\left(P(f) + j\tilde{P}(f)\right) \tag{13}$$

where $\tilde{P}(f)=-j \operatorname{sgn}(f)P(f)$ is the Hilbert transform of P(f). The VSB pulse may be represented as $$P_v(f) = \frac{1}{2}X(f) + \frac{j}{2}\left(\tilde{X}(f) + 2X(f)H_\alpha(f)\right) \tag{14}$$

and the baseband pulse signal $$p_v(t) = \frac{1}{2}x(t) + \frac{j}{2}(\tilde{x}(t) + x_a(t)) - p_{vi}(t) + jp_{vq}(t) \tag{15}$$

where $p_{vi}(t)$ is the in-phase component, $p_{vq}(t)$ is the quadrature component, and $$x_a(t) = 2\int_{-a}^{a} X(f)H_\alpha(f)e^{j2\pi ft}\,df \tag{16}$$

Before the data is transmitted, the ATSC signal also embeds a carrier signal, which has −11.5 dB less power than the data signal. This carrier aids in coherent demodulation of the signal. Consequently, the transmitted signal can be represented as:

$$s(t) = \sum_n C_n\{p_{vi}(t-nT)\cos(\omega t) - p_{vq}(t-nT)\sin(\omega t)\} + A\cos(\omega t) \tag{17}$$

where $C_n$ is the 8-level data signal.

Monitor Units

Figure 12:
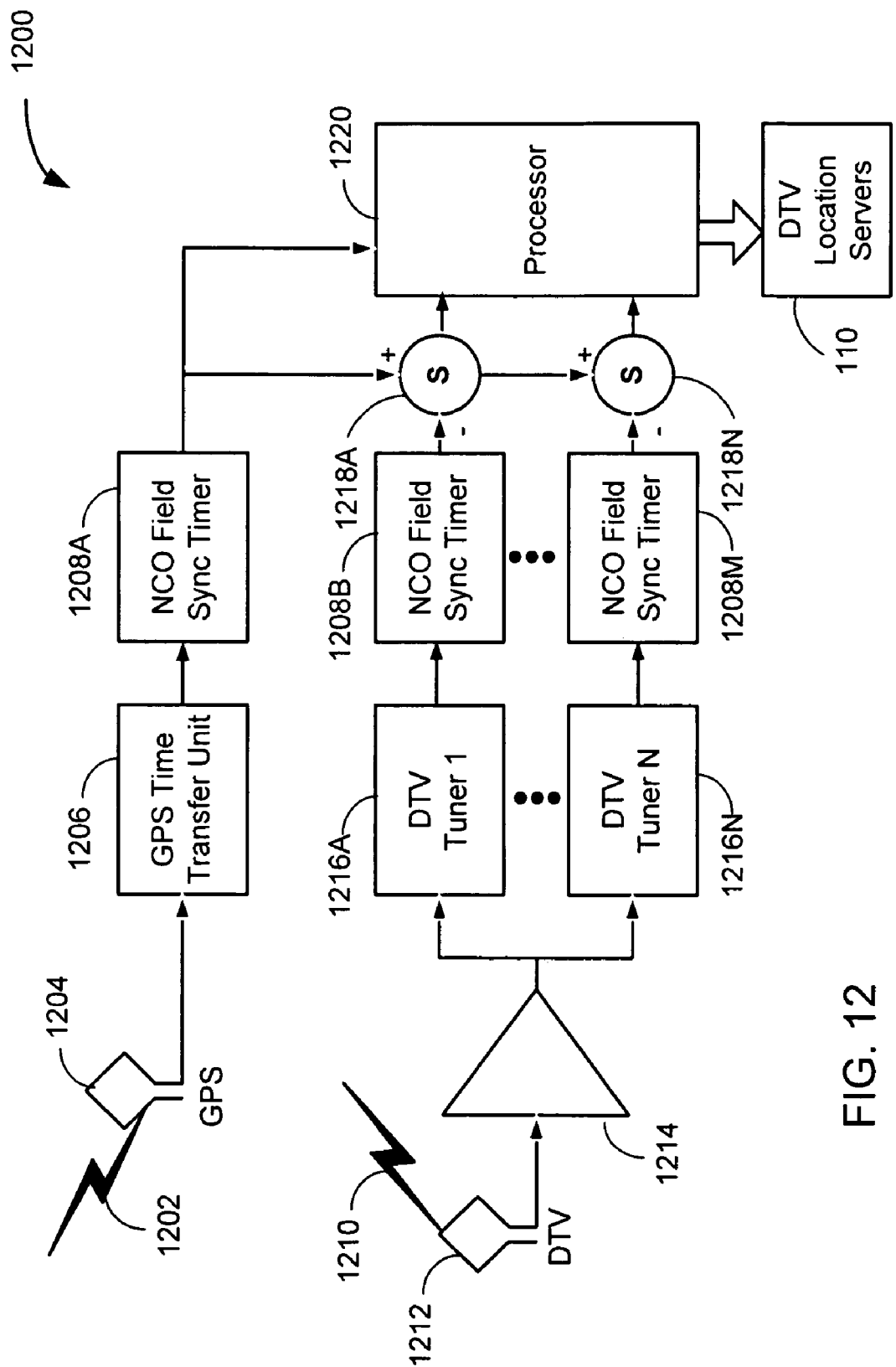
FIG. 12 depicts an implementation of a monitor unit.

FIG. 12 depicts an implementation 1200 of monitor unit 108. Monitor units are also described in U.S. Non-provisional patent application Ser. No. 11/552,231 filed Oct. 24, 2006, the disclosure thereof incorporated by reference herein in its entirety.

Referring to FIG. 12, an antenna 1204 receives GPS signals 1202. A GPS time transfer unit 1206 develops a master clock signal based on the GPS signals. In order to determine the offset of the DTV transmitter clocks, a NCO (numerically controlled oscillator) field synchronization timer 1208A develops a master synchronization signal based on the master clock signal. The master synchronization signal can include one or both of the ATSC segment synchronization signal and the ATSC field synchronization signal. In one implementation, the NCO field synchronization timers 1208A in all of the monitor units 108 are synchronized to a base date and time. In implementations where a single monitor unit 108 receives DTV signals from all of the same DTV transmitters that user terminal 102 does, it is not necessary to synchronize that monitor unit 108 with any other monitor unit for the purposes of determining the position of user terminal 102. Such synchronization is also unnecessary if all of the monitor stations 108, or all of the DTV transmitters, are synchronized to a common clock.

A DTV antenna 1212 receives a plurality of DTV signals 1210. In another implementation, multiple DTV antennas are used. An amplifier 1214 amplifies the DTV signals. One or more DTV tuners 1216A through 1216N each tunes to a DTV channel in the received DTV signals to produce a DTV channel signal. Each of a plurality of NCO field synchronization timers 1208B through 1208M receives one of the DTV channel signals. Each of NCO field synchronization timers 1208B through 1208M extracts a channel synchronization signal from a DTV channel signal. The channel synchronization signal can include one or both of the ATSC segment synchronization signal and the ATSC field synchronization signal. Note that the pilot signal and symbol clock signal within the DTV signal can be used as acquisition aids.

Each of a plurality of summers 1218A through 1218N generates a clock offset between the master synchronization signal and one of the channel synchronization signals. Processor 1220 formats and sends the resulting data to DTV location server 110. In one implementation, this data includes, for each DTV channel measured, the identification number of the DTV transmitter, the DTV channel number, the antenna phase center for the DTV transmitter, and the clock offset. This data can be transmitted by any of a number of methods including air link and the Internet. In one implementation, the data is broadcast in spare MPEG packets on the DTV channel itself.

Software Receivers

One thorough approach to mitigating the effects of multipath is to sample an entire autocorrelation function, rather than to use only early and late samples as in a hardware setup. Multipath effects can be mitigated by selecting the earliest correlation peak.

In the case that position can be computed with a brief delay, such as in E911 applications, a simple approach is to use a software receiver, which samples a sequence of the filtered signal, and then processes the sample in firmware on a DSP.

Figure 13:
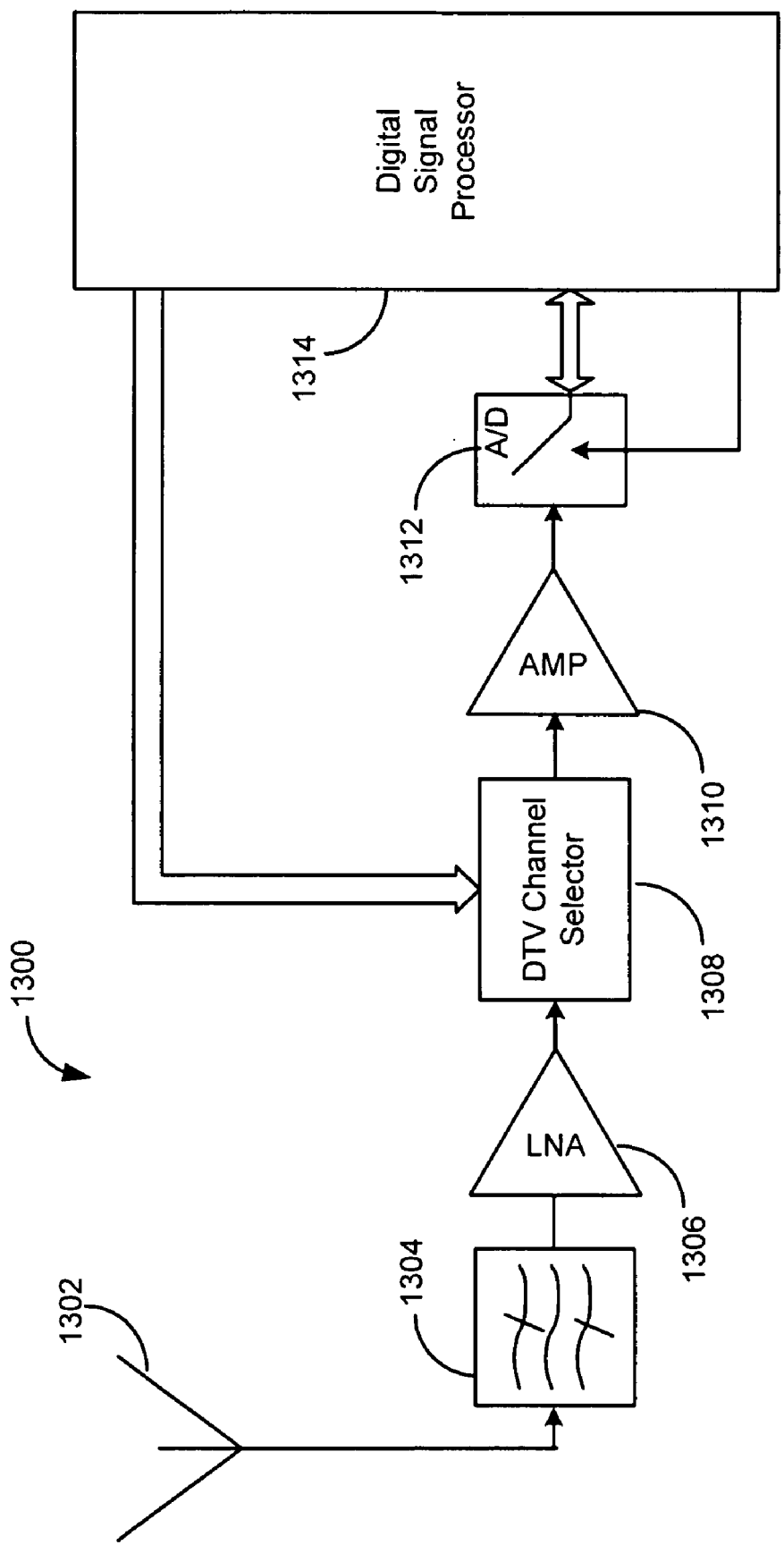
FIG. 13 illustrates one implementation for tracking in software.

FIG. 13 illustrates one implementation 1300 for tracking in software. An antenna 1302 receives a DTV signal. Antenna 1302 can be a magnetic dipole or any other type of antenna capable of receiving DTV signals. A bandpass filter 1304 passes the entire DTV signal spectrum to an LNA 1306. In one implementation, filter 1304 is a tunable bandpass filter that passes the spectrum for a particular DTV channel under the control of a digital signal processor (DSP) 1314.

A low-noise amplifier (LNA) 1306 amplifies and passes the selected signal to a DTV channel selector 1308. DTV channel selector 1308 selects a particular DTV channel under the control of DSP 1314, and filters and downconverts the selected channel signal from UHF (ultra-high frequency) to IF (intermediate frequency) according to conventional methods. An amplifier (AMP) 1310 amplifies the selected IF channel signal. An analog-to-digital converter and sampler (A/D) 1312 produces digital samples of the DTV channel signal s(t) and passes these samples to DSP 1314.

Now the processing of the DTV channel signal by DSP 1314 is described for a coherent software receiver. A nominal offset frequency for the downconverted sampled signal is assumed. If this signal is downconverted to baseband, the nominal offset is 0 Hz. The process generates the complete autocorrelation function based on samples of a signal s(t). The process may be implemented far more efficiently for a low duty factor signal. Let $T_i$ be the period of data sampled, $\omega_{in}$ be the nominal offset of the sampled incident signal, and let $\omega_{offset}$ be the largest possible offset frequency, due to Doppler shift and oscillator frequency drift. The process implements the pseudocode listed below.

$R_{max} = 0$

Create a complex code signal $s_{code}(t) = \Sigma \overline{C}_n \{p_{vi}(t-nT_i) + jp_{vq}(t-nT_i)\}$ where $\overline{C}_n$ is zero for all symbols corresponding to data signals and non-zero for all symbols corresponding to synchronization signals.

For $\omega = \omega_{in} - \omega_{offset}$ to $\omega_{in} + \omega_{offset}$ step $0.5\frac{\pi}{T_i}$ Create a complex mixing signal $s_{mix}(t) = \cos(\omega t) + j\sin(\omega t)$, $t = [0 \ldots T_i]$ Combine the incident signal s(t) and the mixing signal $s_{mix}(t)$ $s_{comb}(t) = s(t)s_{mix}(t)$ Compute the correlation function $R(\tau) = s_{code} * s_{comb}(\tau)$ If $\max_\tau |R(\tau)| > R_{max}$, $R_{max} \leftarrow \max_\tau |R(\tau)|$, $R_{store}(\tau) = R(\tau)$ Next $\omega$ Upon exit from the process, $R_{store}(\tau)$ will store the correlation between the incident signal s(t) and the complex code signal $s_{code}(t)$. $R_{store}(\tau)$ may be further refined by searching over smaller steps of $\omega$. The initial step size for $\omega$ must be less then half the Nyquist rate $$\frac{2\pi}{T_i}.$$

The time offset $\tau$ that produces the maximum correlation output is used as the pseudo-range.

A technique for generating the non-coherent correlation in software is now described. This approach emulates the hardware receivers of FIGS. 4 and 5. Note that while the I and Q channels are treated separately in the block diagrams, the I and Q components may be combined to generate the mixing signal in software. Since the non-coherent correlator uses envelope detection, it is not necessary to search over a range of intermediate frequencies. The process implements the pseudocode listed below.

Create the in-phase and quadrature code signals $c_i(t) = \Sigma \overline{C}_n p_{vi}(t-nT_i)$, $c_q(t) = \Sigma \overline{C}_n p_{vq}(t-nT_i)$ where the sum is over n, $\overline{C}_n$ is zero for all symbols corresponding to data signals and non-zero for all symbols corresponding to synchronization signals. Note that $c_i$ has autocorrelation $R_i$, $c_q$ has autocorrelation $R_q$, and that their cross-correlation is $R_{iq}$.

For $\tau = 0$ to $T_{per}$ step $T_{samp}$ where $T_{per}$ is the period of the code being used, and $T_{samp}$ is the sample interval Create a reference code mixing signal $s_{mix}(t) = c_i(t+\tau)\cos(\omega t + vt + \Phi) + c_q(t+\tau)\sin(\omega t + vt + \Phi)$ where $\omega$ is the nominal IF frequency of the incident signal, $v$ is the frequency offset of the mixing signal relative to the incident signal, and $\Phi$ is the phase offset of the mixing signal from the incident signal.

Combine the incident signal s(t) and the reference code mixing signal $s_{mix}(t)$. $s_{comb}(t) = s(t)s_{mix}(t)$ Low-pass filter $s_{comb}(t)$ to generate $s_{filt}(t)$ such that the expected value of $s_{filt}(t)$ is given by $E[s_{filt}(t)] = 2R_i(\tau)\cos(vt+\Phi) + 2R_{iq}(\tau)\sin(vt+\Phi)$ where we have used that fact that $R_i(\tau) = -R_q(\tau)$ Perform envelope detection on $s_{filt}(t)$ (for example, by squaring and filtering) to generate the non-coherent correlation: $z(\tau)=2[R_i(\tau)^2+R_{iq}(\tau)^2]$ Next $\tau$ The time offset $\tau$ that produces the maximum correlation output is used as the pseudo-range.

Figure 14:
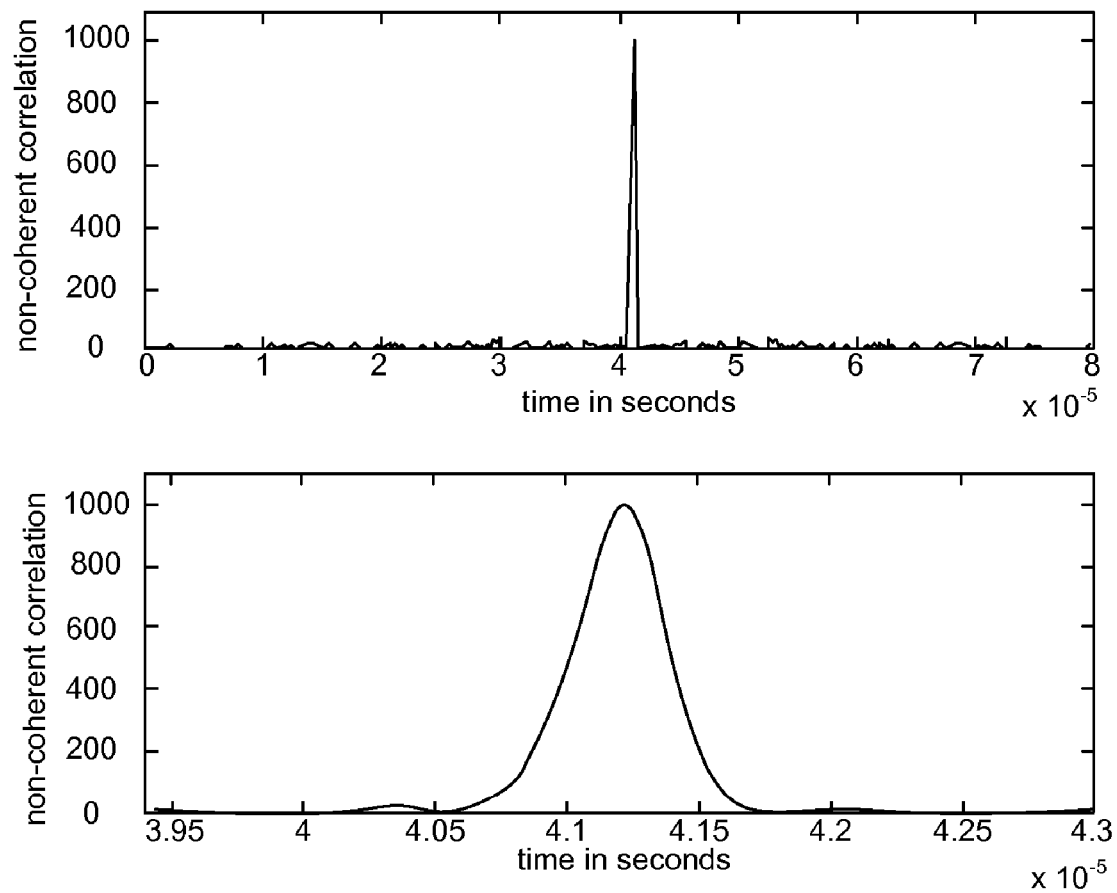
FIG. 14 shows a plot of the output of the non-coherent correlator.

Notice that the non-coherent correlation $z(\tau)$ makes use of the signal power in both the in-phase and quadrature components. However, as a result of this, the effective bandwidth of the signal that generates the non-coherent correlation is halved. The output of the non-coherent correlator is illustrated in FIG. 14. The upper plot shows the correlation peak for an interval of roughly $8 \times 10^{-5}$ seconds. The upper plot shows the effective 3 MHz bandwidth of the correlation peak.

Positioning Algorithm

Figure 15:
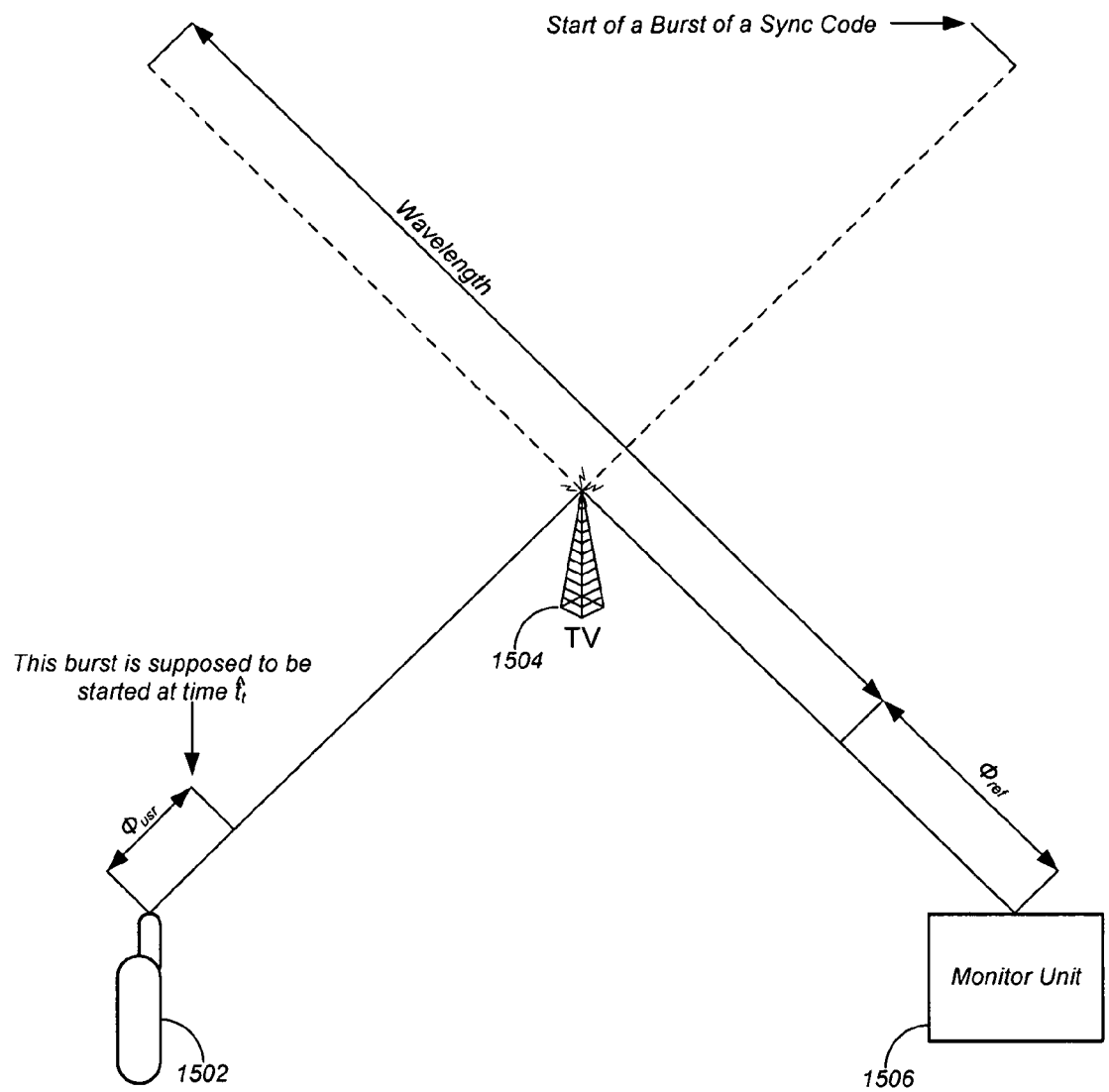
FIG. 15 provides a physical description of a positioning problem.

FIG. 15 provides a physical description of the positioning problem which illustrates the terminology used herein. Referring to FIG. 15, a user terminal 1502, a single TV transmitter 1504, and a single monitor unit 1506 are shown. For clarity, the positioning algorithm assumes the use of a single monitor unit 1506 or reference. Also assumed is that rough timing synchronization (on the order of several milliseconds) exists between monitor unit 1506 and the user terminal 1502. This level of timing synchronization is not used directly in the computation of user position, which requires timing information accurate to the nanosecond level. However, this level of timing synchronization considerably simplifies the position computation. Other versions of the positioning algorithm enable positioning without the rough time synchronization between user and monitor.

Note that the reference is the location of monitor unit 1506. However, when multiple monitor units 1506 are used to track a single transmitter 1504, a "virtual reference" may be created, which is the location of an imaginary monitor unit 1506, the measurements from which would correspond to the combined information from the multiple monitor units 1506.

User terminal 1502 starts sampling the signal at some absolute time $t_u$. The term absolute time is used to distinguish from the time perceived by user terminal 1502, which doesn't have a perfect clock and consequently doesn't know what the exact or absolute time is. According to user terminal 1502, sampling starts at some time, $\hat{t}_u$, which is offset from absolute time by the user clock bias at the time $t_u$:

$$\hat{t}_u = t_u + \tau_u(t_u) \tag{18}$$

FIG. 15 represents a snapshot of the signals propagating from TV transmitter 1504 to user terminal 1502 and monitor unit 1506 at absolute time $t_u$. The part of the signal which is represented by a dotted line has yet to be transmitted. The pseudorange measurement that is computed at user terminal 1502, $\phi_{usr}$, is in essence the time from the start of sampling to the instant when the burst of the synch code arrives at the antenna of user terminal 1502, multiplied by the speed of light, c. Notice that $\phi_{usr}$ can only be measured modulus the wavelength, $\lambda_t$, of the code of transmitter 1504, which repeats every $\lambda_t/c$ seconds. The synchronization burst which user terminal 1502 measures is transmitted from transmitter 1504 at time $t_t$. Notice that transmitter 1504 also has an imperfect clock and consequently doesn't have knowledge of exact time. According to transmitter 1504, the synch pulse is transmitted at time $\hat{t}_t$, which is offset from absolute time by the transmitter clock bias at time $t_t$:

$$\hat{t}_t = t_t + \tau_t(t_t) \tag{19}$$

Consequently, the pseudorange measurement at user terminal 1502 for a transmitter, t, can be described as:

$$\phi_{usr,t}(t_u) = \mathrm{mod}(r_{ut} - t_u c + t_t c + b_u, \lambda_t) \tag{20}$$

The term $b_u$, referred to herein as hardware bias, is included to represent all the delays that the signal incurs from the time the signal arrives at the antenna of user terminal 1502 to the time the signal is sampled. This includes effects such as group delay of filters, line delays and other delays caused by system hardware. Substituting equation (18) into equations (19) and (20) describing the imperfect clocks of user terminal 1502 and transmitter 1504 yields:

$$\phi_{usr,t}(t_u) = \mathrm{mod}(r_{ut} + b_u - \hat{t}_u c + \tau_u(t_u) c + \hat{t}_t c - \tau_t(t_t) c, \lambda_t) \tag{21}$$

The mod operation can be eliminated by including in the measurement some unknown integer cycle ambiguity, $N_{ut}$, for the user measurement of the transmitter t. In addition, since the transmitter clock is relatively stable, and the time at which the synch burst is transmitted, $t_t$, is relatively close to the time at which sampling begins, $t_u$, a simplifying assumption $\tau_t(t_u) \approx \tau_t(t_t)$ can be used. Then, the measurement at user terminal 1502 can be described as:

$$\phi_{usr,t}(t_u) = r_{ut} + b_u - \hat{t}_u c + \tau_u(t_u) c + \hat{t}_t c - \tau_t(t_u) c - N_{ut} \lambda_t \tag{22}$$

Similarly, a phase measurement at the reference, or monitor unit 1506, can be described as:

$$\phi_{ref,t}(t_r) = r_{rt} + b_r - \hat{t}_r c + \tau_r(t_r) c + \hat{t}_t c - \tau_t(t_r) c - N_{rt} \lambda_t \tag{23}$$

where the subscript r has been used to replace the subscript u to describe the same physical and timing phenomena at the reference that we have described at user terminal 1502. The differential positioning methodology can be implemented by differencing the measurement made at user terminal 1502 and the reference for a particular transmitter 1504, t:

$$\varphi_{ru,t} = \varphi_{ref,t}(t_r) - \varphi_{usr,t}(t_u) = \hat{t}_u - \hat{t}_r + r_{rt} - r_{ut} + \\ b_r - b_u + (\tau_r(t_r) - \tau_u(t_u))c - (\tau_t(t_r) - \tau_t(t_u))c - N_{ru,t} \lambda_t \tag{24}$$

where $N_{ru,t}=N_{rt}-N_{ut}$. Assume that the hardware bias in user terminal 1502 and the reference is the same so that $b_r-b_u=0$. Also assume for simplicity that according to the local clocks of user terminal 1502 and the reference, which are offset from absolute time by $\tau_u(t_u)$ and $\tau_r(t_r)$ respectively, user terminal 1502 the and reference think they are sampling the signal at the same time, or $\hat{t}_u-\hat{t}_r=0$. In order to render the measurement in a form that can be used to estimate the necessary parameters, define a user-reference clock bias $\tau_{ru}=\tau_r(t_r)-\tau_u(t_u)$. Using this definition, and expanding the measurement to first order with respect to the user and transmitter clock offsets yields:

$$\varphi_{ru,t} = r_{rt} - r_{ut} + \tau_{ru} c + \frac{\partial \tau_t(t_r)}{\partial t} \tau_r(t_r) c - \frac{\partial \tau_t(t_u)}{\partial t} \tau_u(t_u) c - N_{ru,t} \lambda_t \tag{25}$$

Assuming that the transmitter's clock is relatively stable, and that the difference between the user and the reference clock biases is not too large, the following simplifying assumption can be made:

$$\frac{\partial \tau_t(t_r)}{\partial t} \approx \frac{\partial \tau_t(t_u)}{\partial t} = \frac{\partial \tau_t}{\partial t} \tag{26}$$

Then the pseudorange measurement can be represented in the tractable form:

$$\varphi_{ru,t} = r_{rt} - r_{ut} + \left(1 + \frac{\partial \tau_t(t_r)}{\partial t}\right) c\tau_{ru} - N_{ru,t}\lambda_t \quad (27)$$

Assume measurements are taken from a set of T transmitters 1504. Each of those transmitters 1504 will be associated with a particular integer cycle ambiguity. Let x be the vector of parameters that we wish to resolve: namely the latitude and longitude of user terminal 1502, the clock offset between user terminal 1502 and reference, and the integer ambiguity for each of the channels:

$$x = [r_{u,lat} \, r_{u,lon} \, \tau_{ru} \, N_{ru,1} \ldots N_{ru,T}]^T \quad (28)$$

Notice that the measurement equation (27) is nonlinear in the parameters since the distance between user terminal 1502 and transmitter 1504 is nonlinear in the user latitude and longitude:

$$r_{ut} = \sqrt{(r_{t,lat} - r_{u,lat})^2 + (r_{t,lon} - r_{u,lon})^2} \quad (29)$$

Consequently, these parameters can be resolved using an iterative technique which linearizes the measurement equation around our parameter estimates at each iteration. Based on the current estimates of the parameters, an estimate is computed according to equation (27) of the expected pseudorange measurement: $\hat{\varphi}_{ru,t}$. In order to update the parameters, an estimation error vector is created based on the measurements:

$$y = [\hat{\varphi}_{ru,1} - \varphi_{ru,1} \, \hat{\varphi}_{ru,2} - \varphi_{ru,2} \ldots \hat{\varphi}_{ru,T} - \varphi_{ru,T}]^T \quad (30)$$

The set of estimation errors on T transmitters can now generate a linearized matrix measurement equation:

$$y = H\Delta x + v \quad (31)$$

where $$H = \begin{bmatrix} -\vec{1}_{u1}^T & 1 + \frac{\partial \tau_1(t_r)}{\partial t} & -\lambda_1 & 0 & 0 \\ \vdots & \vdots & 0 & \ddots & 0 \\ -\vec{1}_{uT}^T & 1 + \frac{\partial \tau_T(t_r)}{\partial t} & 0 & 0 & -\lambda_T \end{bmatrix} \quad (32)$$

The term $\vec{1}_{ut}$ is the direction vector from user terminal 1502 to the station t, v is a vector of disturbances or noise terms which we assume are normally distributed with mean 0 and covariance C, and $\Delta x$ are the set of parameter updates. Several canonical techniques for iteratively solving this matrix equation are well-known. The techniques range from treating the integers as real numbers and using a recursive least-squares algorithm to performing an integer search for the non-real parameters. Note that the wavelengths, $\lambda_t$, which correspond to the ATSC segment synch and field synch signals are large—roughly 23 km and 7,360 km respectively. Hence, the cycle ambiguities can be resolved with a high degree of integrity.

Calibrating Performance

Independent of the technique used to resolve the parameters x, it should be noted that the conditioning of the observation matrix, H, contributes to the performance of the positioning system. Consider only the real-valued parameters that require estimation:

$$x_r = [r_{u,lat} \, r_{u,lon} \, \tau_{ru}]^T \quad (33)$$

and assume that all the integer-valued parameters are known a-priori or determined by an integer search. Then, equation (31) with just the real components isolated would become $y = H_r \Delta x_r + v$ where $$H_r = \begin{bmatrix} -\vec{1}_{u1}^T & 1 + \frac{\partial \tau_1(t_r)}{\partial t} \\ \vdots & \vdots \\ -\vec{1}_{uT}^T & 1 + \frac{\partial \tau_T(t_r)}{\partial t} \end{bmatrix} \quad (34)$$

The maximum-likelihood estimate for the real parameter updates would then be:

$$\Delta x_r = (H_r^T C^{-1} H_r)^{-1} H_r^T C^{-1} y \quad (35)$$

If the pseudoranging errors on each channel are uncorrelated and each has variance $\sigma^2$, it is straightforward to show from equation (35) that the expected variance on the estimated parameters is given by:

$$\text{var}(\Delta x_r) = \sigma^2 (H_r^T H_r)^{-1} \quad (36)$$

The matrix $(H_r^T H_r)^{-1}$ determines how the disturbances, v, in the pseudorange measurements are combined with the geometry of the transmitters 1504 to cause errors in the parameters being estimated. The diagonal elements of this matrix correspond to the DOP (Dilution of Precision) factors for the latitude, longitude and clock parameters.

$$\text{Diag}(H_r^T H_r)^{-1} = [DOP_{lat}^2 \quad DOP_{lon}^2 \quad DOP_\tau^2] \quad (37)$$

So, the fundamental HDOP (Horizontal Dilution of Precision) of the navigation system can be computed according to:

$$HDOP = \sqrt{DOP_{lat}^2 + DOP_{lon}^2} \quad (38)$$

Assuming pseudoranging errors on each channel which are normally distributed with variance $\sigma^2$, then horizontal position errors can be expected with a standard deviation of $\sigma(HDOP)$.

Time Transfer

Various embodiments may be used for time transfer in environments where GPS is unreliable. One example application is micro-cells that are placed indoors and in inclement urban environments in order to extend coverage of cellular networks. These cells require frequency stability of roughly 50 parts per billion and need to be synchronized to the network to accuracies of a roughly 3 microseconds in order to achieve handoff of calls between the microcells and existing cellular infrastructure.

Consider the scenario where the user device measures a set of signals with sufficiently low HDOP in order to compute position according to Equation (35). In this case, the user-reference clock bias can be directly computed $\tau_{ru} = \tau_r(t_r) - \tau_u(t_u)$. Consequently, absolute time at the user can be found according to $t_u = \hat{t}_u + \tau_r(t_r) - \tau_{ru}$. Since the reference receiver is driven by a GPS-stabilized clock, $\tau_r(t_r)$ is known to within roughly 50 ns, and the accuracy of this computation is dominated by the error in computing $\tau_{ru}$ in a high-multipath environment for the user device. The magnitude of this error may be estimated based on the positioning accuracy of the system summarized in Table 1 by dividing these errors by the speed of light. In this scenario, the exact time of transmission of the synchronization signal is never directly determined.

TABLE 1

| Error Source | Error 2-sigma (ns) |
| --- | --- |
| GPS-based knowledge of time | 50 |
| GPS-based knowledge of reference location | 50 |
| Knowledge of transmitter location | 100 |
| Calibration of hardware biases | 10 |
| Low-multipath pseudorange error | 50 |
| Total Error assuming independence | 133 |

Next consider the scenario in which the user position cannot be computed, but is known from other sources—for example, by inverse geo-coding of the address at which a micro-cell is known to be installed. Consider Equation (23) above, describing the pseudorange measurement at the reference device. Since the reference receivers are constructed with stable oscillators that are locked to GPS time, many of the terms in this expression can be known independently: Knowledge of the transmitter location (to within 100 ns radial) and the GPS-measured position of the reference receiver (to within 50 ns radial) can be used to determine $r_{rt}$; the local clock can be compared with GPS time to compute $\tau_r(t_r)$ to within 50 ns; $N_{rt}$ can be computed exactly according to FIG. 15 as $\lfloor r_{rt}/\lambda_t \rfloor$; and $b_r$ can be independently measured to within roughly 20 ns. While $b_r$ may be measured to roughly 1 ns in the laboratory, the accuracy is limited to fluctuations in the hardware-induced delay due to temperature and other factors. For example, the dominant group delay in the system is caused by the intermediate-frequency SAW filters, with bandwidths of 6 MHz and group delays of roughly 200 ns. Variations in the group delays of such electronics have been established to be below 10%. The pseudorange measurement $\varphi_{ref,t}$ taken at the reference receiver is accurate to roughly 50 ns in a low-multipath environment. From this set of independent measurements, the time of transmission of the synchronization codes at the transmit antenna can be found according to:

$$t_t = \hat{t}_t - \tau_t(t_r) = \frac{1}{c}(\varphi_{ref,t}(t_r) - r_{rt} - b_r + \hat{t}_r c - \tau_r(t_r)c + N_{rt}\lambda_t) \quad (39)$$

The computation of transmission time of the synchronization signal is subject to the error budget shown in Table 1. This information may then be applied to Equation (22) in order to compute the clock offset of the user device, where the user device could be, for example, a micro-cell in a cellular network.

$$\tau_u(t_u)c = \varphi_{usr,t}(t_u) - r_{ut} - b_u + \hat{t}_u c - c(\hat{t}_t - \tau_t(t_u)) + N_{ut}\lambda_t \quad (40)$$

Note that what has been computed is not $\hat{t}_t - \tau_t(t_u)$ but only $\hat{t}_t - \tau_t(t_r)$. To address this, expand $\tau_t(t_u)$ to first order $$\tau_t(t_u) = \tau_t(t_r) + \frac{\partial \tau_t}{\partial t}(t_u - t_r) = \tau_t(t_r) + \frac{\partial \tau_t}{\partial t}(\hat{t}_u - \hat{t}_r + \tau_u(t_u) - \tau_r(t_r)) \quad (41)$$

$$\hat{t}_t - \tau_t(t_u) = \hat{t}_t - \tau_t(t_r) - \frac{\partial \tau_t}{\partial t}(\hat{t}_u - \hat{t}_r - \tau_r(t_r)) - \frac{\partial \tau_t}{\partial t}\tau_u(t_u) \quad (42)$$

Substituting Equation (42) into Equation (40), and rearranging terms, yields:

$$\tau_u(t_u) = \frac{1}{c}\left(1 + \frac{\partial \tau_t}{\partial t}\right)^{-1}\left(\begin{array}{c}\varphi_{usr,t}(t_u) - r_{ut} - b_u + \hat{t}_u c - c(\hat{t}_t - \tau_t(t_r)) + \\ c\frac{\partial \tau_t}{\partial t}(\hat{t}_u - \hat{t}_r - \tau_r(t_r)) + N_{ut}\lambda_t\end{array}\right) \quad (43)$$

Consider the error budget for this computation. The pseudorange $\varphi_{usr,t}(t_u)$ may be measured with a 2-sigma accuracy of roughly 200 ns in a multipath environment (see positioning results below). Assume that the distance $r_{ut}$ is known to within 300 ns and the receiver hardware bias $b_u$ is calibrated to 20 ns. The term $\hat{t}_u$ is known by definition and the term $\hat{t}_t - \tau_t(t_r)$ is measured to within 133 ns as shown in Table 1. The terms $\hat{t}_u - \hat{t}_r$ are known, and term $\tau_r(t_r)$ is measured to within 50 ns using a GPS-stabilized clock at the reference receiver. The term $\partial \tau_t / \partial t$ refers to the frequency offset of the symbol rate clock at the transmitter. The accuracy with which this is known is determined by the effects of multipath on the pseudorange accuracy at the reference receiver, as well as by the Allan Variance of the transmitter clock which impact how regularly measurements must be taken. Over measurement intervals of roughly 0.1 to 100 seconds, the Allan Variance for a TV transmitter clock may be based upper bounded from the conservative quartz crystal Allan Variance of $10^{-9}$. To track the clock offset more precisely by more rapid measurements, one is typically limited by the accuracy with which the pseudorange can be measured at the reference. For example, recompute $\partial \tau_t / \partial t$, without filtering, for every field synch burst or 24 ms. Given a 2-sigma pseudorange accuracy of 50 ns, $\partial \tau_t / \partial t$ at can be measured to an accuracy of roughly $2 \cdot 10^{-6}$. By filtering the measurements of $\partial \tau_t / \partial t$ with a time constant of roughly 1 second, this term can be measured to an accuracy better than $10^{-8}$. So, given $\hat{t}_u - \hat{t}_r$ of no more than one second, the term $(\partial \tau_t / \partial t)(\hat{t}_u - \hat{t}_r - \tau_r(t_r))$ is known to within 10 ns. As above, the integer ambiguity is computed according to FIG. 15 as $N_{ut} = \lfloor r_{ut}/\lambda_t \rfloor$. The effect of the term $(1 + \partial \tau_t / \partial t)^{-1}$ is dependent primarily on knowledge of $\partial \tau_t / \partial t$, and the magnitude $\hat{t}_u - (\hat{t}_t - \tau_t(t_r)) = \hat{t}_u - t_t$ which is the difference between the time that the user believes this signal is sampled and the absolute time the signal is transmitted, and depends primarily on the clock bias of the user $\tau_u(t_u)$. Given that $\partial \tau_t / \partial t$ is known to $10^{-8}$ and $\tau_u(t_u)$ is no more than 1 second, an error can be expected due to the multiplier $(1 + \partial \tau_t / \partial t)^{-1}$ of 10 ns. A conservative error budget for computing the clock offset of the user according to Equation (43) is roughly 0.4 µs as described in Table 2.

TABLE 2

| Error Source | Error 2-sigma (ns) |
| --- | --- |
| pseudorange accuracy | 200 |
| knowledge of user distance to transmitter | 300 |
| Calibration of hardware biases | 20 |
| Time of transmission of synch code | 133 |
| Clock offset of the reference | 50 |
| Additive effect of transmitter clock rate error | 10 |
| Multiplicative effect of transmitter clock rate error | 10 |
| Total Error assuming independence | 388 |

Note that the techniques described here are not limited to ATSC digital TV transmissions. They may also be applied to any transmission for which a known synchronization code is included for which time of arrival at a receiver can be measured. This includes analog TV using GCR and other reference signals, FM radio from which timing can be extracted using carrier-phase measurements of wide-laned signals; cellular CDMA, TDMA and GSM signals, DVB-T, DVB-H, T-DMB, ISDB-T, MediaFlo, and a host of other COFDM signals.

Synchronizing a User Terminal with Absolute Time

The local clock of a user terminal can be aligned to match absolute time without a local source of absolute time, e.g. a GPS receiver. The better known the location of the user terminal, the higher the accuracy of the synchronization, but the technique is robust enough that some degree of synchronization is possible even with great uncertainty in the location of the user terminal.

One technique employs the predictable evolution of relative phase between NTSC frames and ATSC fields to resolve an integer ambiguity without resorting to stochastic approaches, such as integer search.

Figure 16:
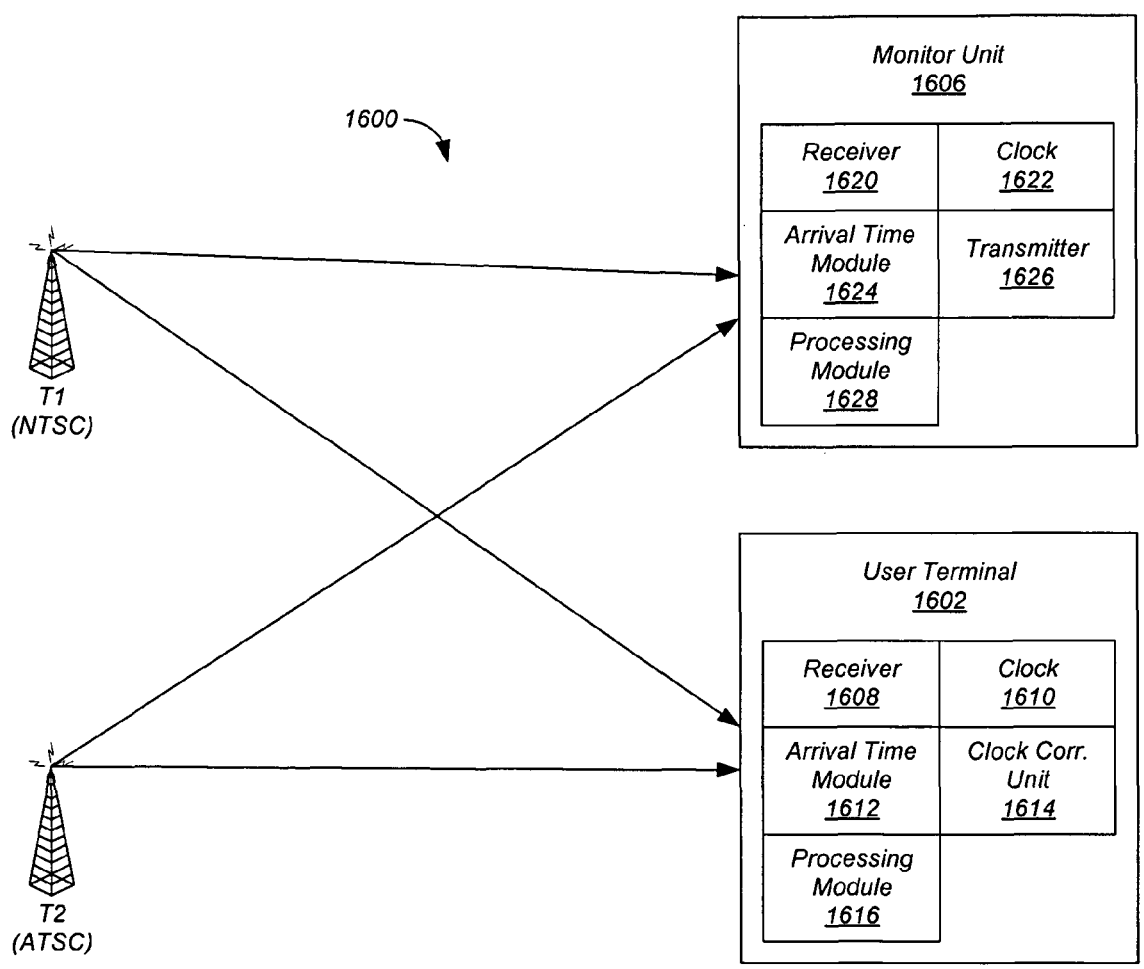
FIG. 16 shows a communication system according to one embodiment.

FIG. 16 shows a positioning system 1600 according to one embodiment. Positioning system 1600 includes a user terminal 1602, an NTSC transmitter T1, an ATSC transmitter T2, and a monitor unit 1606. User terminal 1602 includes a receiver 1608, a clock 1610, an arrival time module 1612, a clock correction module 1614, and a processing module 1616. Monitor unit 1606 includes a receiver 1620, a clock 1622, an arrival time module 1624, a transmitter 1626, and a processing module 1628.

ATSC transmitter T2 transmits an ATSC (digital TV) signal. NTSC transmitter T1 transmits an NTSC signal (analog TV with an embedded timing signal such as the GCR or multiburst). The two transmitters T1, T2 do not have to be co-located. Monitor unit 1606 has a known location and accurate absolute time, e.g. GPS time. The location of user terminal 1602 is available to the monitor unit 1606. However, rough time synchronization can be done without monitor unit 1606 knowing the exact location of user terminal 1602.

Figure 17:
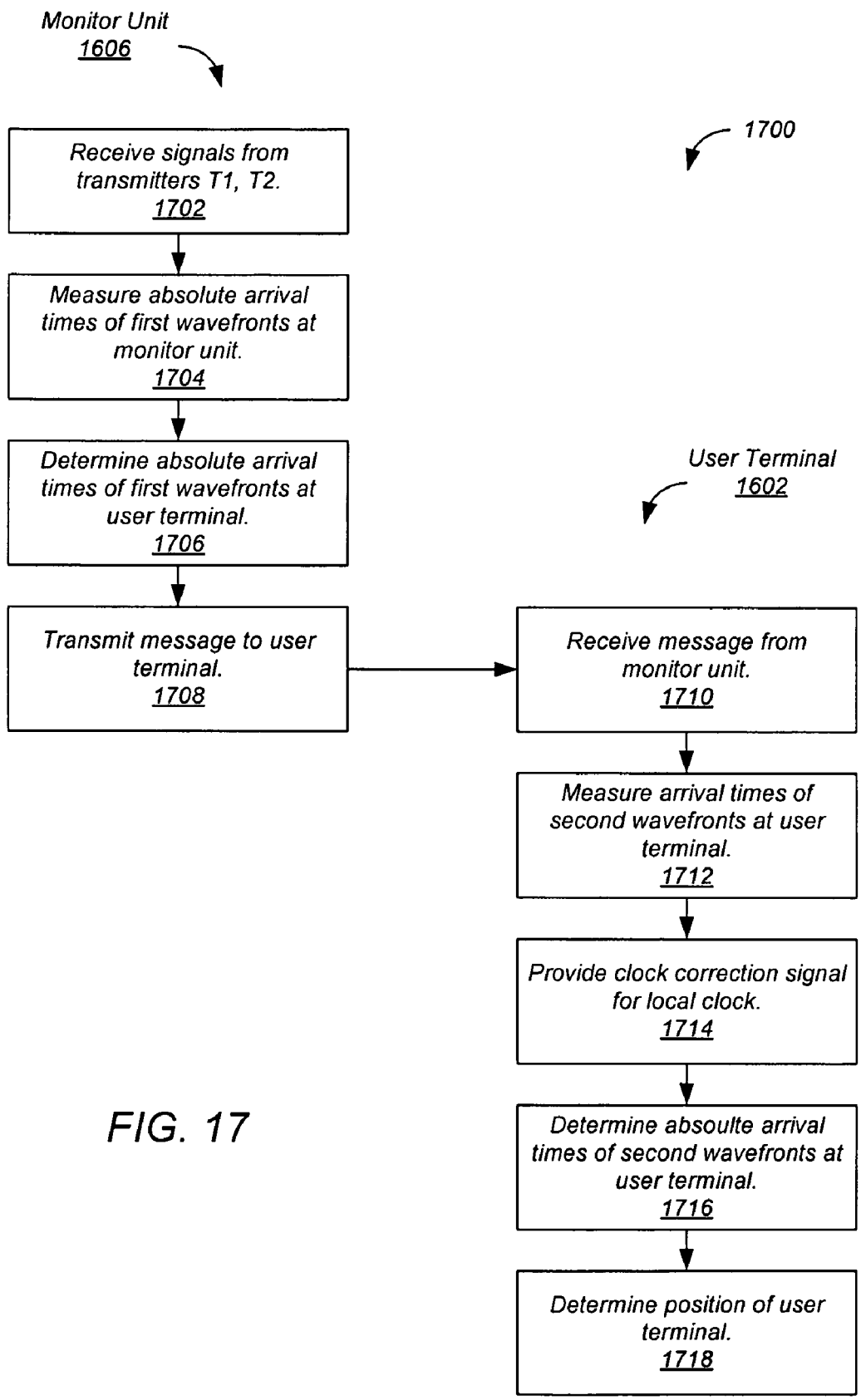
FIG. 17 shows a process for the communication system of FIG. 16 according to one embodiment.

FIG. 17 shows a process 1700 for positioning system 1600 of FIG. 16 according to one embodiment. Although in the described embodiments, the elements of process 1700 are presented in one arrangement, other embodiments may feature other arrangements, as will be apparent to one skilled in the relevant arts based on the disclosure and teachings provided herein. For example, in various embodiments, some or all of the steps of process 1700 can be executed in a different order, concurrently, and the like.

Referring to FIGS. 16 and 17, receiver 1620 of monitor unit 1606 receives signals from transmitters T1, T2 (step 1702). Arrival time module 1624 of monitor unit 1606 measures the absolute time of arrival $T_{U,1}$ of a wavefront from transmitter T1 and the absolute time of arrival $T_{U,2}$ of a wavefront from transmitter T2 based on clock 1622 (step 1704). With knowledge of the position of user terminal 1602, processing module 1628 of monitor unit 1606 computes the absolute time of arrival of those same wavefronts at user terminal 1602 (step 1706), for example using the pseudorange equation, e.g.:

$$T_{U,1} = \frac{R_{U,T1} - R_{M,T1}}{c} + T_{M,T1} \quad (44)$$

$$T_{U,2} = \frac{R_{U,T2} - R_{M,T2}}{c} + T_{M,T2} \quad (45)$$

where $R_{M,T1}$ and $R_{M,T2}$ represent geometric ranges between monitor unit 1606 and transmitters T1 and T2, respectively, and where $R_{U,T1}$ and $R_{U,T2}$ represent geometric ranges between user terminal 1602 and transmitters T1 and T2, respectively.

Transmitter 1626 of monitor unit 1606 transmits a message to user terminal 1602 containing the values $T_{U,1}$ and $T_{U,2}$ (step 1708). Receiver 1608 of user terminal 1602 receives the message (step 1710). After receipt of the message, arrival time module 1612 of user terminal 1602 measures the arrival times $T'_{U,1}$ and $T'_{U,2}$ of one wavefront from each transmitter T1, T2, respectively, based on local clock 1610 (step 1712). Alternatively, user terminal 1602 can measure the difference in arrival times of the wavefronts. These wavefronts are, of course, later wavefronts than those referenced in the message, and may be arbitrarily chosen by user terminal 1602.

The integer wavelength ambiguity constraints on the wavefronts observed at user device mandate that $N_1$ and $N_2$ be integers in the equations below, where $\lambda_1$ and $\lambda_2$ are the wavelengths of transmitter T1 and T2, respectively.

$$T'_{U,1} - T_{U,1} = \frac{N_1 \lambda_1}{c} \quad (46)$$

$$T'_{U,2} - T_{U,2} = \frac{N_2 \lambda_2}{c} \quad (47)$$

Subtract equations (46) and (46) above and rearranging yields:

$$c[(T_{U,1}-T_{U,2})-(T'_{U,1}-T'_{U,2})]=N_2\lambda_2-N_1\lambda_1 \quad (48)$$

All terms on the left hand side of equation (48) are known from observations. Therefore the two unknowns remaining are the integers $N_1$ and $N_2$. Equation (48) has an infinite number solutions for $N_2$, equally spaced at intervals of LCM $(\lambda_1, \lambda_2)/\lambda_2$. Similarly, there are an infinite number of integer solutions for $N_1$, each equally spaced at intervals of LCM($\lambda_1, \lambda_2)/\lambda_1$. It follows that valid solutions for $N_2 \lambda_2$ and $N_2 \lambda_1$ are also periodic and both are spaced at intervals LCM($\lambda_1, \lambda_2$).

In order to completely resolve the integer ambiguity, one additional constraint is applied. Limits are imposed on the time lag, L, between the computed time of arrival $T_U$ of the wavefront represented by the message, and the measured time of arrival $T'_U$ of a different wavefront from the same transmitter:

$$L_{min} < L \leq L_{max} \quad (49)$$

$$L_{min} < (T'_{U,1}-T_{U,1}) \leq L_{max} \quad (50)$$

$$L_{min} < (T'_{U,2}-T_{U,2}) \leq L_{max} \quad (51)$$

Define W to be the possible range of time lag L:

$$W=L_{max}-L_{min} \quad (52)$$

In practice, range W will be almost entirely determined by variations in message latency, e.g. as transmitted via SMS.

There is a unique solution for $N_2$ and $N_1$, as long as the inequality below holds:

$$c \cdot W \leq LCM(\lambda_1, \lambda_2) \quad (53)$$

Once $N_1$ or $N_2$ is known, it can be substituted in equation (46) or (47) to compute the absolute time at which user terminal 1602 measured the arrival of a wavefront. From the NTSC and ATSC specifications, wavelengths $\lambda_1$ and $\lambda_2$ can be calculated.

$$\lambda_1 = \frac{c}{27 \times 10^6} \cdot (2 \cdot 858 \cdot 525) \quad (54)$$

$$\lambda_2 = \frac{c}{27 \times 10^6} \cdot \frac{(6 \cdot 286 \cdot 832 \cdot 313)}{684}$$

Wavelengths $\lambda_1$ and $\lambda_2$ are exactly related by a fraction.

$$\frac{\lambda_1}{\lambda_2} = \frac{89775}{65104} \quad (55)$$

From inequality (53), the maximum tolerable uncertainty in message latency, $W_{max}$, is about 36 minutes. This is essentially the "beat frequency" of the NTSC frame rate and the ATSC field rate.

$$W_{max} = \frac{LCM(\lambda_1, \lambda_2)}{c} \approx 36 \text{ minutes} \quad (56)$$

Setting $L_{min} = 0$, absolute time synchronization at user terminal 1602 can be achieved providing that a message can propagate from monitor unit 1606 to user terminal 1602 in 36 minutes or less. Equation (56) assumes that no errors exist in the transmitter symbol clocks, the receiver's measurements and the estimate of receiver position.

Referring again to FIGS. 16 and 17, clock correction unit 1614 of user terminal 1602 provides a clock correction signal for local clock 1610 based on the measured and reported arrival times (step 1714). Processing module 1616 of user terminal 1602 determines, based on the measured and reported arrival times, an absolute time of arrival at the apparatus of the wavefront of the NTSC TV signal, an absolute time of arrival at the apparatus of the second wavefront of the ATSC television signal, or both (step 1716). Processing module 1616 of user terminal 1602 also determines a position of user terminal 1602 based on the clock correction signal and one or both of the NTSC TV signal and the ATSC TV signal, for example as described above (step 1718).

For the moment, assume that the symbol clocks at transmitters T1 and T2 are perfect (no frequency offset and no jitter) and that the position of user terminal 1602 is known exactly. The measurement errors allowed at user terminal 1602 and monitor units 1606, i.e. due to clock imperfections or multipath, are now described.

Let m represent a combination of the observed quantities and substitute it into equation (48).

$$m = (T_{U,1} - T_{U,2}) - (T'_{U,1} - T'_{U,2}) \quad (57)$$

$$(58) \quad c \cdot m = N_2 \lambda_2 - N_1 \lambda_1$$

The maximum allowed measurement error of m before integer ambiguities result is given by $$|\Delta m_{max}| = \left(\frac{1}{2c}\right) \frac{\lambda_1 \cdot \lambda_2}{LCM(\lambda_1, \lambda_2)} \quad (59)$$

That corresponds to an allowed maximum time error in measurements, $\Delta m_{max}$, of approximately 186 ns. In practice, most of that measurement error is contributed by user terminal 1602, since monitor unit 1606 is optimized for high accuracy measurements with a precise local clock, directional antennas, filters, etc.

Because m is an equation describing the relative phase of two waves, symbol rate frequency offsets at the transmitters cause errors in m that increase with time. Eventually, those errors can grow large enough to cause integer ambiguities in the solution for $N_1$ and $N_2$. Hence, symbol rate offsets may decrease the maximum allowed value of W below the ideal case. The maximum allowed transmitter frequency error, assuming no measurement errors at the user or monitor can be derived from equation (58).

$$|(\gamma_1 - \gamma_2)W| \leq \Delta m_{max} \quad (60)$$

where
$\gamma_1$=fractional frequency error for transmitter T1
$\gamma_2$=fractional frequency error for transmitter T2

According to equation (60), the uncorrectable difference between the two transmitter clocks must not be greater than 1 ns per 11.7 seconds of W. For example, if $W=W_{max}$ then the time slip between the two transmitter clocks must not be more than 186 ns in 36 minutes. That's about 0.08 ppb accuracy (or 0.06 ppb per transmitter, assuming each has equal error). The integer ambiguity can be resolved correctly when:

$$|(\gamma_1 - \gamma_2)W + \epsilon_u + \epsilon_m + \epsilon_R| \leq \Delta m_{max} \quad (61)$$

where
$\gamma_1$=fractional frequency error for transmitter T1
$\gamma_2$=fractional frequency error for transmitter T2
$\epsilon_u$=user error; i.e. error in measuring $(T'_{U,1} - T'_{U,2})$
$\epsilon_m$=monitor error; i.e. error in measuring $(T_{M,1} - T_{M,2})$
$\epsilon_r$=positioning error; i.e. error in determining $$\left(\frac{R_{U,T1} - R_{U,T2}}{c}\right)$$

The maximum permitted measurement error, $\Delta m_{max}$, of 186 ns is not unattainable, but it is unlikely to be achieved in conditions of even minor multipath degradation. It is possible that more tightly controlled timestamp message latency result in larger allowed values of $\Delta m_{max}$. However, this can't be determined analytically as it depends on the particular numerical values of $\lambda_1$ and $\lambda_2$. Simulated results, summarized in Table 3, reveal that gradual reductions in $W_{max}$ result in stepwise reductions in $\Delta m_{max}$.

Of interest is the third line of Table 3, which shows that it is possible to resolve the $N_1/N_2$ integer ambiguity even when the uncertainty in position is several tens of miles, i.e. when position is estimated only via the location of the nearest cellular tower. It is likely, however, that the low value of $W_{max}$ required would dictate that GPRS or some other type of packet data transfer mechanism be used rather than SMS. Another possibility is to use a different technique to roughly estimate L to within $W_{max}$ or better and use this mixed-lambda approach to refine that estimate.

TABLE 3

| $\Delta m_{max}(\mu s)$ | $W_{max}$ (seconds) |
|---|---|
| 0.186 | 2172 |
| 255 | 3.17 |
| 764 | 0.97 |
| 2547 | 0.27 |

If the integer wavelength ambiguity can be resolved completely using the techniques above, there are three remaining limitations on the accuracy of time transfer. First, the wavefront arrival timestamps $T'_{U,1}$ and $T'_{U,2}$, as computed from equations (44) and (45), are subject to error due to inaccurate knowledge of the user's location. Specifically, errors in the range between the user device and the transmitters ($R_{U,T1}$ or $R_{U,T2}$) introduce a time offset with respect to absolute time. Additional timestamp error may be due to unmitigated multipath components or clock errors at the monitor, which affect the measurement of $T_{M,1}$ and $T_{M,2}$.

Second, there is uncertainty in the temporal localization of $T'_{u,1}$ and $T'_{u,2}$. If SNR levels are reasonably high (such that the Cramer-Rao bound is not the limiting factor), the main sources of error will be uncorrectable multipath. There may also be (much smaller) error contribution due to local oscillator clock drift in the user device.

Third, there may be significant delay through the analog front-end, which will introduce a time offset. SAW filters are the primary culprit here, as they can impose delays of tens of microseconds. However, this error is common to all stimulus received via the tuner, so it is only of importance when local interaction with the synchronized clock is necessary.

The first limitation exposes a chicken-and-egg situation in that accurate time synchronization requires accurate user position, but accurate user position (via TOA techniques) is presumably the goal of accurate time synchronization. An iterative technique can be used to simultaneously resolve position and absolute time.

Another technique employs colocated TV transmitter pairs, that is, pairs of ATSC (or pairs of NTSC) channels that are located on the same transmission tower. A colocated pair of transmitters implies knowledge of the distance between the two transmitters, which removes the requirement of a priori knowledge of the receiver's position.

For a given channel i, the receiver produces an estimate of the time-of-arrival (TOA) of the channel's synchronization waveform at the receiver $TOA_i$. Mathematically, this estimate can be represented using the pseudorange equation:

$$\hat{R}_i/c = TOA_i - TOT_i + b + v_i \qquad (62)$$

with $TOT_i$ representing the time the synchronization waveform was emitted from the transmitter, $R_i$ representing the distance between transmitter and receiver, b representing the receiver clock bias common to all TOA measurements, and $v_i$ representing the measurement error. The $TOT_i$ value is generally provided by a monitor unit, which has absolute knowledge of its own time and position.

The transmitter periodically transmits the synchronization waveform with period $\lambda_i$. Thus, the fact that the $TOT_i$ reported by the monitor may not directly correspond to the waveform received at the user should be considered. Equation (62) can be expanded to include this ambiguity, so that $$(63) \quad \hat{R}_i/c = TOA_i - (TOT_i + N_i\lambda_i) + b + v_i$$

where $N_i$ is the number of periods between the monitor unit's TOT measurement and the user's TOA measurement. Note that $N_i$ is restricted to an integer value.

The ambiguity term $N_i$ can be resolved or eliminated to allow application of the pseudorange equation in determining the user's position. First, consider a pair of pseudoranges for channels i and j, leading to $$(\hat{R}_i - \hat{R}_j)/c = \qquad (64)$$
$$(TOA_i - TOA_j) - (TOT_i - TOT_j) + (N_i\lambda_i - N_j\lambda_j) + (v_i - v_j)$$

The $(TOA_i - TOA_j)$ term is a time-difference-of-arrival (TDOA) measurement. By taking this difference, the bias term b is eliminated. Channels i and j are required to be a colocated pair; that is both i and j must be located on the same tower. This means that $R_i = R_j$, or $R_i - R_j = 0$. Assuming the measurement noise $(v_i - v_j)$ is significantly small yields $$(N_i\lambda_i - N_j\lambda_j) = (TOT_j - TOT_i) - (TOA_i - TOA_j) = t_{diff} \qquad (65)$$

Assuming $\lambda_i \approx \lambda_j \approx \lambda$ an estimate of the difference between $N_i$ and $N_j$ is given by $$\Delta_{ij} = N_i - N_j = \text{round}(t_{diff}/\lambda) \qquad (66)$$

Substituting $N_j = N_i - ij$ yields $$N_i\lambda_i = (N_i - \Delta_{ij})\lambda_j = t_{diff} \qquad (67)$$

or $$N_i = \frac{t_{diff} - \Delta_{ij}\lambda_j}{\lambda_i - \lambda_j} \qquad (68)$$

Thus, the channel's actual time of transmission is $TOT_i + N_i\lambda_i$.

An error analysis of this technique begins with defining a fractional code rate offset (FCRO) quantity, which measures the clock offset of a given transmitter. The FCRO of channel i is defined as $$FCRO_i = \frac{\lambda - \lambda_i}{\lambda_i} = \frac{\lambda}{\lambda_i} - 1 \qquad (69)$$

where $\lambda$ is the period associated with an ideal transmitter clock. Also, $$\lambda_i = \frac{\lambda}{1 + FCRO_i} \qquad (70)$$

Substituting equation (70) into equation (68) yields $$N_i = \frac{t_{diff} - \Delta_{ij}\lambda_j}{\lambda\left(\frac{1}{1+FCRO_i} - \frac{1}{1+FCRO_j}\right)} \qquad (71)$$

Now, assuming $FCRO_i \ll 1$, which is generally the case, then $$\frac{1}{1+FCRO_i} \approx 1 - FCRO_i \quad (72)$$

and $$N_i = \frac{t_{diff} - \Delta_{ij}\lambda_j}{\lambda(FCRO_j - FCRO_i)} \quad (73)$$

The likelihood of an erroneous estimate of $N_i$ is directly related to the denominator ($FCRO_j-FCRO_i$), which is the delta-FCRO between channels i and j. The larger a colocated pair's delta-FCRO, the smaller the likelihood of a measurement error (in $t_{diff}$) leading to an error in estimating $N_i$. As an example, consider an ATSC channel pair having delta-FCRO=1e-6. Using the fact that $\lambda$=0.0241972 for ATSC signals, the minimum amount of measurement error that produces an incorrect ambiguity estimate is $$\left|\frac{1}{2} \cdot (0.0241972) \cdot (1 \times 10^{-6})\right| = 12.1 \text{ ns} \quad (74)$$

Other methods for time transfer exist. These include time stamping of sampled data at a user device and a monitor unit, where strong correlation between the two data sets in conjunction with user position and clock bias estimation yield precise and accurate absolute time. Furthermore, broadcast systems such as MediaFlo, DVB and T-DMB include both frame counters and coarse time (hour, minute) descriptors in their data messages. Extracting those values from the broadcast data messages could be used to provide imprecise but accurate time to a user device, not unlike the function of the z-count for GPS. Precision of the time estimate would then be ensured by resolving user position and clock bias.

Embodiments within the scope of the present invention can be implemented in digital electronic circuitry, computer hardware, firmware, software, or in combinations thereof. Embodiments can be implemented in computer-readable media embodying computer-executable instructions or data structures. Such computer-readable media can include any media which is accessible by a general-purpose or special-purpose computer system, and can include physical storage media, or any other media, which can embody computer-executable instructions or data structures, and which can be accessed by a general-purpose or special-purpose computer system. Physical storage media can include, for example, semiconductor memory devices such as RAM, ROM, EPROM, EEPROM, and flash memory devices; magnetic disks such as internal hard disks and removable disks; magneto-optical disks; optical disks such as CD-ROM, DVD; and the like. Any of the foregoing can be supplemented by, or incorporated in, ASICs (application-specific integrated circuits).

Method steps of the invention can be performed by a programmable processor executing a program of instructions to perform functions of the invention by operating on input data and generating output. Embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors can include both general-purpose microprocessors and special-purpose microprocessors.

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
a first receiver adapted to receive television signals and a message, wherein the television signals include an NTSC television signal and an ATSC television signal, wherein the message represents a first arrival time and a second arrival time, wherein the first arrival time represents an absolute time of arrival at the apparatus of a first wavefront of the NTSC television signal, and wherein the second arrival time represents an absolute time of arrival at the apparatus of a first wavefront of the ATSC television signal;
a local clock;
a first arrival time module adapted to measure a third arrival time and a fourth arrival time, based on the local clock, after the first receiver receives the message, wherein the third arrival time represents a time of arrival at the apparatus of a second wavefront of the NTSC television signal, and wherein the fourth arrival time represents a time of arrival at the apparatus of a second wavefront of the ATSC television signal; and
a clock correction unit adapted to provide a clock correction signal for the local clock based on the first arrival time, the second arrival time, the third arrival time, and the fourth arrival time.

2. The apparatus of claim 1, further comprising:
a processing module adapted to determine, based on the first arrival time, the second arrival time, the third arrival time, and the fourth arrival time, at least one of an absolute time of arrival at the apparatus of the second wavefront of the NTSC television signal, and
an absolute time of arrival at the apparatus of the second wavefront of the ATSC television signal.

3. The apparatus of claim 1, further comprising:
a processing module adapted to determine a position of the apparatus based on the clock correction signal and at least one of
the NTSC television signal, and
the ATSC television signal.

4. The apparatus of claim 1, further comprising:
a monitor unit adapted to provide the message.

5. The apparatus of claim 4, wherein the monitor unit comprises:
a second receiver adapted to receive the television signals;
a reference clock;
a second arrival time module adapted to measure a fifth arrival time and a sixth arrival time based on the reference clock, wherein the fifth arrival time represents an absolute time of arrival at the monitor unit of the first wavefront of the NTSC television signal, and wherein the sixth arrival time represents an absolute time of arrival at the monitor unit of the first wavefront of the ATSC television signal;

a processing module adapted to determine the first arrival time and the second arrival time based on the fifth arrival time and a sixth arrival time; and a transmitter adapted to transmit the message.

6. The apparatus of claim 1, wherein the time module is further adapted to measure the third arrival time and the fourth arrival time within a time limit after the first receiver receives the message.

7. The apparatus of claim 6, wherein the time limit is determined based on the wavelengths of the NTSC and ATSC television signals.

8. The apparatus of claim 6, wherein the time limit is equal to or less than thirty six minutes.

9. The apparatus of claim 6, wherein the time limit comprises a first time limit and a second time limit, and wherein:
the first time limit is a time within which the time module measures the third arrival time after the first receiver receives the message, and
the second time limit is a time within which the time module measures the fourth arrival time after the first receiver receives the message.

10. The apparatus of claim 6, wherein the NTSC television signal is transmitted from a NTSC transmitter with a NTSC transmitter clock and the ATSC television signal is transmitted from an ATSC transmitter with an ATSC transmitter clock, and wherein the difference between the NTSC transmitter clock and the ATSC transmitter clock is within a maximum clock difference.

11. The apparatus of claim 10, wherein the maximum clock difference depends on the time limit.

12. The apparatus of claim 10, wherein the maximum clock difference is less than 1 ns per 11.7 seconds of the time limit.

13. The apparatus of claim 6, wherein the message received at the first receiver is comprised in a message protocol that depends on the time limit.

14. The apparatus of claim 13, wherein the message protocol is short message service (SMS) when the time limit is 0.97 seconds or longer, and wherein the message protocol is a general packet radio service (GPRS) when the time limit is less than 0.97 seconds.

15. The apparatus of claim 1, wherein the time module is adapted to measure the third arrival time and the fourth arrival time with a maximum time error.

16. The apparatus of claim 15, wherein the maximum time error is determined based on the wavelengths of the NTSC and ATSC television signals.

17. The apparatus of claim 15, wherein the maximum time error is 186 ns.

18. An apparatus comprising:
first receiver means for receiving television signals and a message, wherein the television signals include an NTSC television signal and an ATSC television signal, wherein the message represents a first arrival time and a second arrival time, wherein the first arrival time represents an absolute time of arrival at the apparatus of a first wavefront of the NTSC television signal, and wherein the second arrival time represents an absolute time of arrival at the apparatus of a first wavefront of the ATSC television signal;
first arrival time means for measuring a third arrival time and a fourth arrival time, based on a local clock, after the first receiver means receives the message, wherein the third arrival time represents a time of arrival at the apparatus of a second wavefront of the NTSC television signal, and wherein the fourth arrival time represents a time of arrival at the apparatus of a second wavefront of the ATSC television signal; and clock correction means for providing a clock correction signal for the local clock based on the first arrival time, the second arrival time, the third arrival time, and the fourth arrival time.

19. The apparatus of claim 18, further comprising:
processing means for determining, based on the first arrival time, the second arrival time, the third arrival time, and the fourth arrival time, at least one of an absolute time of arrival at the apparatus of the second wavefront of the NTSC television signal, and
an absolute time of arrival at the apparatus of the second wavefront of the ATSC television signal.

20. The apparatus of claim 18, further comprising:
processing means for determining a position of the apparatus based on the clock correction signal and at least one of
the NTSC television signal, and
the ATSC television signal.

21. The apparatus of claim 18, further comprising:
monitor means for providing the message.

22. The apparatus of claim 21, wherein the monitor means comprises:
second receiver means for receiving the television signals;
a second arrival time module adapted to measure a fifth arrival time and a sixth arrival time based on a reference clock, wherein the fifth arrival time represents an absolute time of arrival at the monitor unit of the first wavefront of the NTSC television signal, and wherein the sixth arrival time represents an absolute time of arrival at the monitor unit of the first wavefront of the ATSC television signal;
processing means for determining the first arrival time and the second arrival time based on the fifth arrival time and a sixth arrival time; and
transmitter means for transmitting the message.

23. A method comprising:
receiving television signals and a message at an apparatus, wherein the television signals include an NTSC television signal and an ATSC television signal, wherein the message represents a first arrival time and a second arrival time, wherein the first arrival time represents an absolute time of arrival at the apparatus of a first wavefront of the NTSC television signal, and wherein the second arrival time represents an absolute time of arrival at the apparatus of a first wavefront of the ATSC television signal;
measuring a third arrival time and a fourth arrival time, based on a local clock, after receiving the message, wherein the third arrival time represents a time of arrival at the apparatus of a second wavefront of the NTSC television signal, and wherein the fourth arrival time represents a time of arrival at the apparatus of a second wavefront of the ATSC television signal; and
providing a clock correction signal for the local clock based on the first arrival time, the second arrival time, the third arrival time, and the fourth arrival time.

24. The method of claim 23, further comprising:
determining, based on the first arrival time, the second arrival time, the third arrival time, and the fourth arrival time, at least one of an absolute time of arrival at the apparatus of the second wavefront of the NTSC television signal, and
an absolute time of arrival at the apparatus of the second wavefront of the ATSC television signal.

25. The method of claim 23, further comprising:
determining a position of the apparatus based on the clock correction signal and at least one of the NTSC television signal, and
the ATSC television signal.

26. The method of claim 23, further comprising:
providing the message.

27. The method of claim 23, further comprising:
receiving the television signals;
measuring a fifth arrival time and a sixth arrival time based on a reference clock, wherein the fifth arrival time represents an absolute time of arrival at a monitor unit of the first wavefront of the NTSC television signal, and wherein the sixth arrival time represents an absolute time of arrival at the monitor unit of the first wavefront of the ATSC television signal;
determining the first arrival time and the second arrival time based on the fifth arrival time and a sixth arrival time; and
transmitting the message.

28. Tangible, non-transitory computer-readable media embodying instructions executable by a computer to perform a method comprising:
receiving television signals and a message at an apparatus, wherein the television signals include an NTSC television signal and an ATSC television signal, wherein the message represents a first arrival time and a second arrival time, wherein the first arrival time represents an absolute time of arrival at the apparatus of a first wavefront of the NTSC television signal, and wherein the second arrival time represents an absolute time of arrival at the apparatus of a first wavefront of the ATSC television signal;
measuring a third arrival time and a fourth arrival time, based on a local clock, after receiving the message, wherein the third arrival time represents a time of arrival at the apparatus of a second wavefront of the NTSC television signal, and wherein the fourth arrival time represents a time of arrival at the apparatus of a second wavefront of the ATSC television signal; and
providing a clock correction signal for the local clock based on the first arrival time, the second arrival time, the third arrival time, and the fourth arrival time.

29. The computer-readable media of claim 28, wherein the method further comprises:
determining, based on the first arrival time, the second arrival time, the third arrival time, and the fourth arrival time, at least one of
an absolute time of arrival at the apparatus of the second wavefront of the NTSC television signal, and
an absolute time of arrival at the apparatus of the second wavefront of the ATSC television signal.

30. The computer-readable media of claim 28, wherein the method further comprises:
determining a position of the apparatus based on the clock correction signal and at least one of
the NTSC television signal, and
the ATSC television signal.

31. The computer-readable media of claim 28, wherein the method further comprises:
providing the message.

32. The computer-readable media of claim 28, wherein the method further comprises:
receiving the television signals;
measuring a fifth arrival time and a sixth arrival time based on a reference clock, wherein the fifth arrival time represents an absolute time of arrival at a monitor unit of the first wavefront of the NTSC television signal, and wherein the sixth arrival time represents an absolute time of arrival at the monitor unit of the first wavefront of the ATSC television signal;
determining the first arrival time and the second arrival time based on the fifth arrival time and a sixth arrival time; and
transmitting the message.

33. A system, comprising:
a monitor unit adapted to provide a message; and
a user terminal, comprising:
a first receiver adapted to receive television signals and to receive the message provided by the monitor unit, wherein the television signals include an NTSC television signal and an ATSC television signal, wherein the message represents a first arrival time and a second arrival time, wherein the first arrival time represents an absolute time of arrival at the monitor unit of a first wavefront of the NTSC television signal, and wherein the second arrival time represents an absolute time of arrival at the monitor unit of a first wavefront of the ATSC television signal;
a local clock;
a first arrival time module adapted to measure a third arrival time and a fourth arrival time, based on the local clock, after the first receiver receives the message, wherein the third arrival time represents a time of arrival at the user terminal of a second wavefront of the NTSC television signal, and wherein the fourth arrival time represents a time of arrival at the user terminal of a second wavefront of the ATSC television signal;
a clock correction unit adapted to provide a clock correction signal for the local clock based on the first arrival time, the second arrival time, the third arrival time, and the fourth arrival time; and
a processing module adapted to determine, based on the first arrival time, the second arrival time, the third arrival time, and the fourth arrival time, at least one of an absolute time of arrival at the user terminal of the second wavefront of the NTSC television signal, and an absolute time of arrival at the user terminal of the second wavefront of the ATSC television signal, and to determine a position of the user terminal based on the clock correction signal and at least one of the NTSC television signal and the ATSC television signal.

34. The system of claim 33, wherein the monitor unit comprises:
a second receiver adapted to receive the television signals;
a reference clock;
a second arrival time module adapted to measure a fifth arrival time and a sixth arrival time based on the reference clock, wherein the fifth arrival time represents an absolute time of arrival at the monitor unit of the first wavefront of the NTSC television signal; and wherein the sixth arrival time represents an absolute time of arrival at the monitor unit of the first wavefront of the ATSC television signal;
a processing module adapted to determine the first arrival time and the second arrival time based on the fifth arrival time and a sixth arrival time; and
a transmitter adapted to transmit the message.

35. A method comprising:
receiving at an apparatus a first television signal, a second television signal, and a message, wherein the message represents a first time of transmittal and a second time of transmittal, wherein the first time of transmittal represents the time the first television signal was transmitted, and wherein the second time of transmittal represents the time the second television signal was transmitted;

estimating a first time of arrival and a second time of arrival based on a local clock, wherein the first time of arrival represents the time the first television signal was received, and wherein the second time of arrival represents the time the second television signal was received; and providing a clock correction signal for the local clock based on the first time of arrival, the second time of arrival, the first time of transmittal, and the second time of transmittal.

36. The method of claim 35, wherein the first and second television signals are ATSC signals.

37. The method of claim 35, wherein the first and second television signals are NTSC signals.

38. The method of claim 35, wherein the first television signal is transmitted from a first transmitter and the second television signal is transmitted from a second transmitter, and wherein the first transmitter and the second transmitter are located on a same transmission tower.

39. The method of claim 35, further comprising determining a position of the apparatus based on the clock correction signal and at least one of the first television signal and the second television signal.

* * * * *